(12) United States Patent
Tanaka et al.

(10) Patent No.: US 8,531,068 B2
(45) Date of Patent: *Sep. 10, 2013

(54) ROTATION SENSOR AND DIRECT CURRENT MOTOR

(75) Inventors: Ken Tanaka, Nukata-gun (JP); Yasuhiro Fukagawa, Obu (JP); Masaru Touge, Kariya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 236 days.

This patent is subject to a terminal disclaimer.

(21) Appl. No.: 12/928,641

(22) Filed: Dec. 16, 2010

(65) Prior Publication Data

US 2011/0148258 A1    Jun. 23, 2011

(30) Foreign Application Priority Data

Dec. 17, 2009    (JP) ................................ 2009-286483

(51) Int. Cl.
*H02K 11/00*    (2006.01)

(52) U.S. Cl.
USPC ........................................................ 310/68 B

(58) Field of Classification Search
USPC .................... 310/68 B, 68 R, 220, 231, 233; 361/118–120, 127; 388/811
See application file for complete search history.

(56) References Cited

U.S. PATENT DOCUMENTS

| 8,222,776 B2 * | 7/2012 | Tanaka et al. ............... 310/67 R |
| 2003/0075998 A1 * | 4/2003 | Edelson ..................... 310/68 R |

FOREIGN PATENT DOCUMENTS

| DE | 102007013711 | * 9/2008 |
| JP | 61-247260 | 11/1986 |
| JP | 3-270662 | 12/1991 |
| JP | 2003-111465 | 4/2003 |
| JP | 2003-299324 | 10/2003 |
| JP | 2005-340301 | 12/2005 |
| JP | 2006-197754 | 7/2006 |
| JP | 2007-258311 | 10/2007 |

* cited by examiner

*Primary Examiner* — Tran Nguyen
(74) *Attorney, Agent, or Firm* — Harness, Dickey & Pierce, PLC

(57) ABSTRACT

A direct current motor includes an armature coil having at least three phase coils, a commutator having multiple commutator segments connected to the armature coil, a pair of brushes in slidable contact with the commutator to supply power to the phase coils through the commutator, a rotation shaft, and a ring varistor coaxially fixed to the rotation shaft and having a ring-shaped varistor body and multiple electrodes that are circumferentially arranged on a surface of the varistor body. Each commutator segment is connected to a corresponding electrode of the ring varistor. The electrodes of the ring varistor are paired to form electrode pairs. Each electrode pair includes any two of the electrodes. A capacitance of one electrode pair is different from a capacitance of another electrode pair.

9 Claims, 15 Drawing Sheets

ROTATION SENSOR AND DIRECT CURRENT MOTOR

CROSS REFERENCE TO RELATED APPLICATION

This application is based on and incorporates herein by reference Japanese Patent Application No. 2009-286483 filed on Dec. 17, 2009.

FIELD OF THE INVENTION

The present invention relates to a rotation sensor for detecting a rotation state of a direct current motor and also relates to the direct current motor.

BACKGROUND OF THE INVENTION

A brushed direct current motor (hereinafter called the "DC motor") has been widely used in a vehicle. For example, the DC motor is used in an air-mixing damper and a mode damper of an air conditioner of a vehicle. The air-mixing damper allows temperature adjusting, and the mode damper allows air outlet switching. There is a need to accurately detect a rotation state (e.g., rotation angle, rotation direction, rotation speed) of the DC motor in order to accurately control such dampers.

In a conventional method, a rotation state of a DC motor is detected by using a large-scale sensor such as a rotary encoder or a potentiometer. Such a conventional method using the large-scale sensor can be employed to detect a rotation state of a vehicular DC motor.

However, the use of the large-scale sensor in a vehicle increases the size, weight, and cost of the vehicle. Therefore, there is an increased demand for a sensorless method to detect a rotation state of a DC motor without using the large-scale sensor.

Some sensorless methods have been proposed. In one sensorless method, a rotation state of a DC motor is detected by detecting and counting a surge pulse that is generated when the contact between a commutator and a brush changes. However, this method based on the surge pulse has the following disadvantage. The electromotive force of the motor is small, when the motor rotates at low speed, for example, when the motor starts and stops. Accordingly, the surge pulse is small, when the motor rotates at low speed. Therefore, it becomes more difficult to detect the surge pulse, as the rotation speed of the motor becomes lower. As a result, a detection error may occur.

JP 2003-111465 A discloses another sensorless method. In the method disclosed in JP 2003-111465 A, a resistor is connected between two of commutator segments of a commutator so that the resistor can be connected in parallel to a phase coil connected between the two commutator segments, and a rotation pulse is detected based on, an electric current flowing between the commutator segments.

In the method disclosed in JP 2003-111465 A, when a direct current is supplied through brushes to a motor circuit (i.e., armature coil side circuit), the current flowing between the brushes changes periodically according to a rotation angle of a motor. Since the rotation pulse is detected based on a change in the current, the method disclosed in JP 2003-111465 A can improve a detection accuracy compared to the method based on the surge pulse.

However, the method disclosed in JP 2003-111465 A has the following disadvantage. The change in the current flowing to the motor circuit causes a variation in torque of the motor. Due to the torque variation, the motor produces noise or an apparatus driven by the motor produces noise.

Further, even in the method disclosed in JP 2003-111465 A, as the rotation speed of the motor becomes lower, the change in the current becomes smaller. Therefore, a detection error may occur.

SUMMARY OF THE INVENTION

In view of the above, it is an object of the present invention to provide a rotation sensor for accurately detecting a rotation state of a direct current motor regardless of a rotation speed of the direct current motor while preventing torque variations. It is another object of the present invention to provide the direct current motor.

According to an aspect of the present invention, a rotation sensor including a direct current motor, a power source, an energization detector, and a rotation state detector. The direct current motor includes an armature coil having at least three phase coils, a commutator having multiple commutator segments connected to the armature coil, a pair of brushes in slidable contact with the commutator to supply power to the phase coils through the commutator, a rotation shaft, and a ring varistor coaxially fixed to the rotation shaft and having a ring-shaped varistor body and multiple electrodes that are circumferentially arranged on a surface of the varistor body. The power source generates an alternating superimposed voltage by superimposing a direct current voltage on an alternating current voltage and applies the alternating superimposed voltage between the pair of brushes. The energization detector detects at least one of a motor current and a path voltage. The motor current flows to the motor through the pair of brushes. The path voltage is a voltage between predetermined two points on a path in which the motor current flows. The rotation state detector detects a rotation state of the motor based on an alternating current component of the detected motor current or the detected path voltage. The rotation state includes at least one of a rotation angle, a rotation direction, and a rotation speed of the motor. Each of the commutator segments of the commutator is connected to a corresponding one of the electrodes of the ring varistor. The electrodes of the ring varistor are paired to form electrode pairs. Each electrode pair includes any two of the electrodes. A first one of the electrode pairs has a first capacitance therebetween. A second one of the electrode pairs has a second capacitance therebetween. The first capacitance is different from the second capacitance.

According to another aspect of the present invention, a direct current motor includes an armature coil having at least three phase coils, a commutator having multiple commutator segments connected to the armature coil, a pair of brushes in slidable contact with the commutator to supply power to the phase coils through the commutator, a rotation shaft, and a ring varistor coaxially fixed to the rotation shaft and having a ring-shaped varistor body and multiple electrodes that are circumferentially arranged on a surface of the varistor body. Each of the commutator segments of the commutator is connected to a corresponding one of the electrodes of the ring varistor. The electrodes of the ring varistor are paired to form electrode pairs. Each electrode pair includes any two of the electrodes. A first one of the electrode pairs has a first capacitance therebetween. A second one of the electrode pairs has a second capacitance therebetween. The first capacitance is different from the second capacitance.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

Embodiments of the present invention are described below with reference to the drawings.

First Embodiment

Figure 1B:
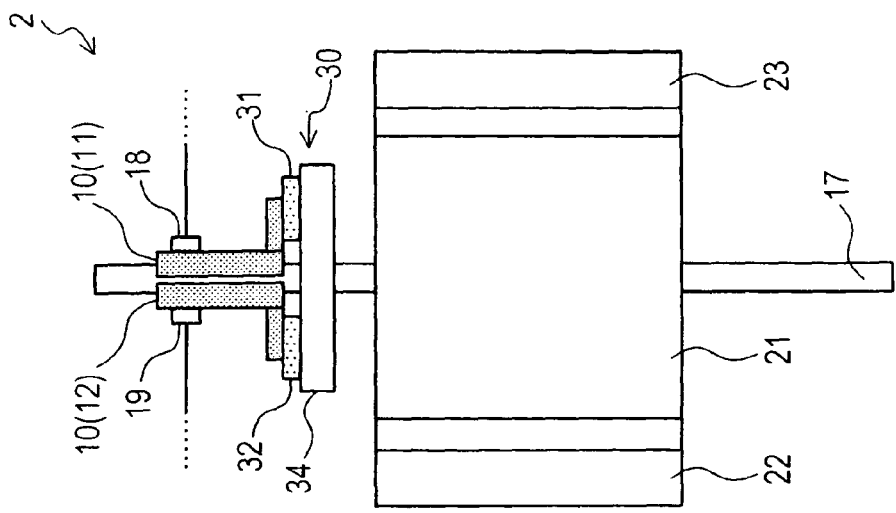
FIG. 1B is a diagram illustrating a front view of the motor viewed from a direction indicated by an arrow in FIG. 1A.
Figure 1A:
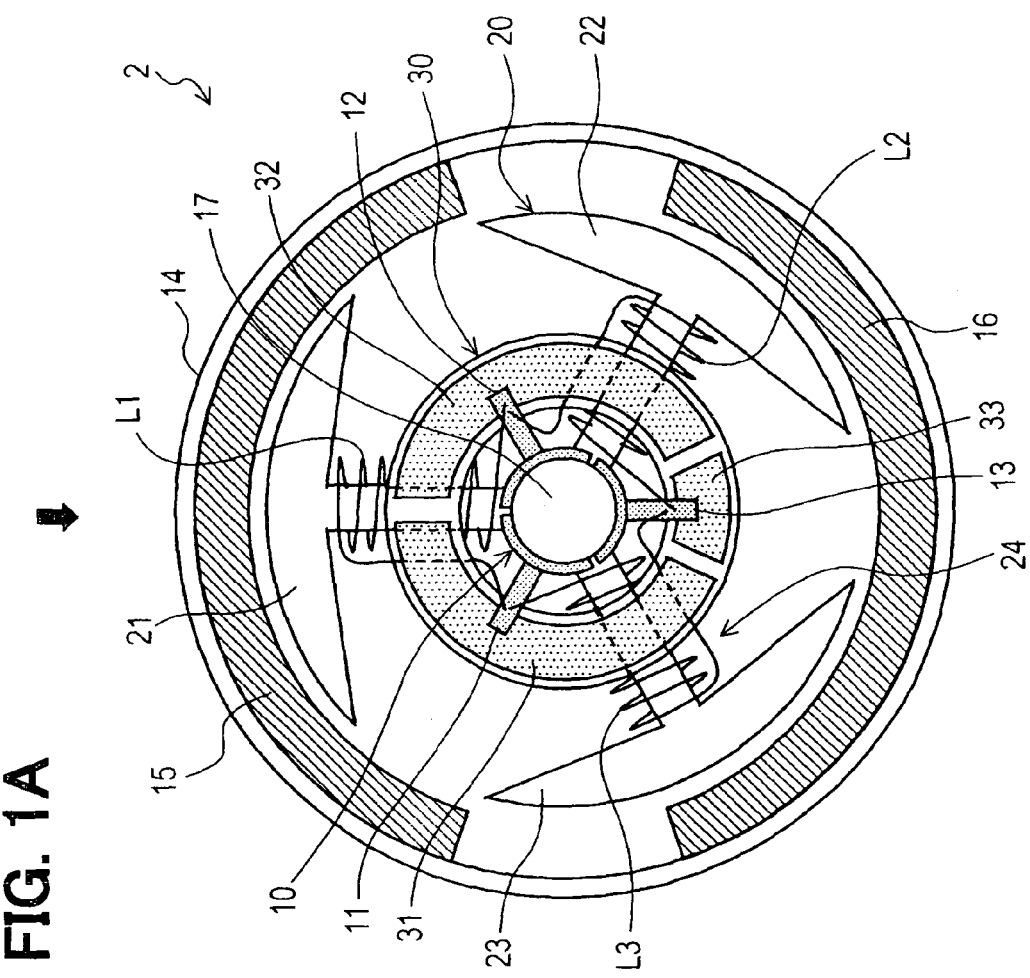
FIG. 1A is a diagram illustrating a plan view of a motor according to a first embodiment of the present invention.

A motor 2 according to a first embodiment of the present invention is described below with reference to FIGS. 1A and 1B. FIG. 1A is a plan view of the motor 2. FIG. 1B is a front view of the motor 2 viewed from a direction indicated by an arrow in FIG. 1A. For the sake of simplicity, a housing 14 and magnets 15, 16 of the motor 2 are omitted in FIG. 1A, and a pair of brushes 18, 19 of the motor 2 is omitted in FIG. 1B.

The motor 2 includes a housing 14 and a rotor core 20 held in the housing 14. The rotor core 20 is fixed to a rotating shaft 17 that is located in a center axis of the housing 14. The rotor core 20 rotates with the rotating shaft 17.

The housing 14 is made of a soft magnetic material (i.e., yoke) and has a substantially cylindrical shape. Two field magnets 15, 16 are fixed to an inner surface of the housing 14 in such a manner that the field magnets 15, 16 are located radially opposite to each other. Each of the magnets 15, 16 is a permanent magnet. A surface of one of the field magnets 15, 16 facing the rotor core 20 has a north pole, and a surface of the other of the field magnets 15, 16 facing the rotor core 20 has a south pole. Thus, the motor 2 is configured as a two-pole direct current (DC) motor.

The rotor core 20 is made of a soft magnetic material. The rotor core 20 has three teeth including a first tooth 21, a second tooth 22, and a third tooth 23. An armature coil 24 is wound around the rotor core 20. Specifically, the armature coil 24 has three phase coils including a first phase coil L1, a second phase coil L2, and a third phase coil L3. The first phase coil L1 is wound around the first tooth 21 of the rotor core 20, the second phase coil L2 is wound around the second tooth 22 of the rotor core 20, and the third phase coil L3 is wound around the third tooth 23 of the rotor core 20.

A commutator 10 is fixed to the rotating shaft 17. As shown in FIG. 1B, a pair of brushes 18, 19 is in slidable contact with the commutator 10. The brushes 18, 19 are located opposite to each other, i.e., spaced apart from each other by 180 degrees in a rotation direction.

Specifically, the commutator 10 has three commutator segments including a first commutator segment 11, a second commutator segment 12, and a third commutator segment 13. Each of the commutator segments 11, 12, 13 is in slidable contact with the brushes 18, 19. The commutator segments 11, 12, 13 are connected to the phase coils L1 L2, L3 of the armature coil 24 in a delta configuration.

Specifically, the first phase coil L1 is connected between the first commutator segment 11 and the second commutator segment 12, the second phase coil L2 is connected between the second commutator segment 12 and the third commutator segment 13, and the third phase coil L3 is connected between the third commutator segment 13 and the first commutator segment 11. It is noted that the phase coils L1, L2, L3 have the same inductance value and are spaced apart from each other by an electrical angle of 2n/3.

Any two of the three commutator segments 11, 12, 13 make contact with the brushes 18, 19, respectively. It is noted that there is a moment in time when all the commutator segments 11, 12, 13 make contact with the brushes 18, 19. The two of the three commutator segments 11, 12, 13 making contact with the brushes 18, 19 change with rotation of the commutator 10 that rotates with rotation of the motor 2. Thus, the motor 2 is configured as a three-phase brushed DC motor.

A ring varistor 30 is coaxially fixed to one end of the rotating shaft 17. The ring varistor 30 has a disk shape with a center hole. The one end of the rotating shaft 17 is inserted through the center hole of the ring varistor 30.

Figure 2A:
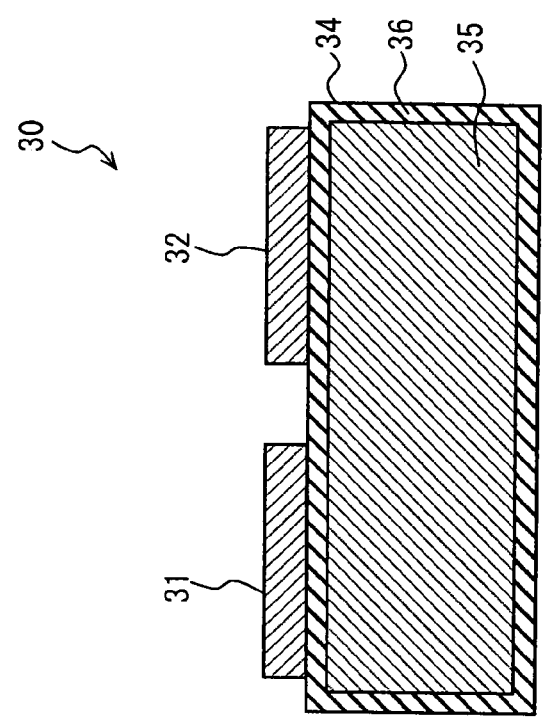
FIG. 2A is a diagram illustrating a plan view of a ring varistor of the motor.

The ring varistor 30 is described in detail below with reference to FIGS. 2A and 2B. The ring varistor 30 includes a disk-shaped varistor body 34 with the center hole. The varistor body 34 has front and back surfaces opposite to each other. Each of the front and back surfaces of the varistor body 34 is perpendicular to the center axis of the rotating shaft 17. The front surface of the varistor body 34 is located on the commutator 10 side. The ring varistor 30 further includes three electrodes 31, 32, 33 on the front surface of the varistor body 34.

Figure 2B:
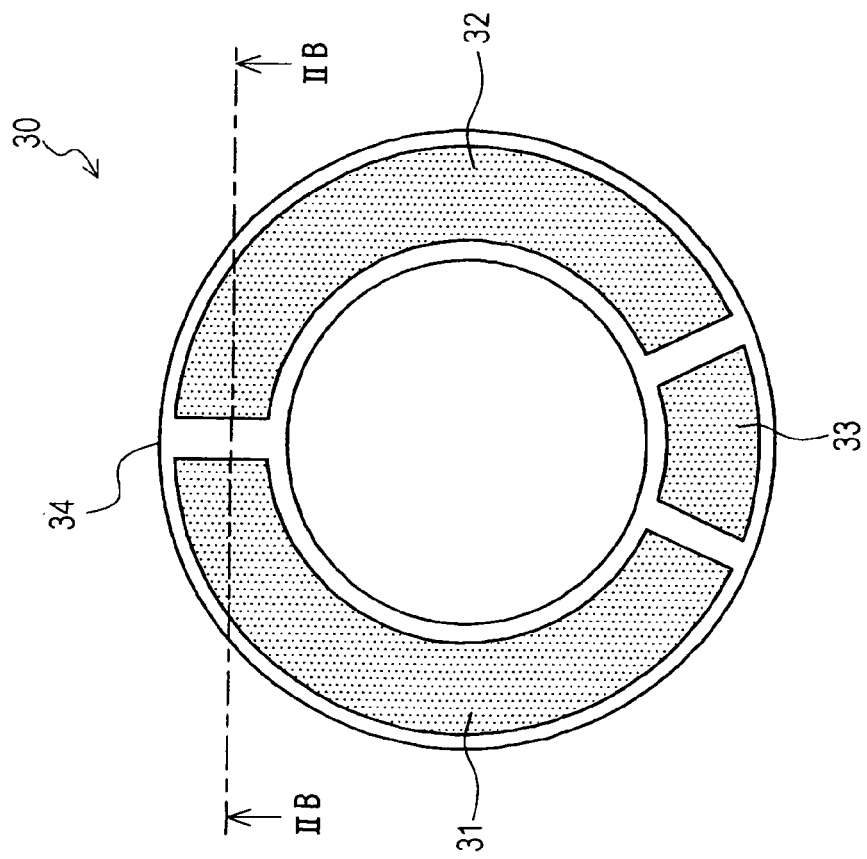
FIG. 2B is a diagram illustrating a cross-sectional view taken along the lines IIB-IIB in FIG. 2A.

As shown in FIG. 2B, the varistor body 34 includes a semiconductor layer 35 and an insulation layer 36 on the semiconductor layer 35. For example, the semiconductor layer 35 can be made of a semiconductor ceramic material such as zinc oxide (ZnO) or strontium titanate ($SrTiO3$). For example, the insulation layer 36 can be an oxide layer. A resistance of the insulation layer 36 is greater than a resistance of the semiconductor layer 35. Therefore, from a resistance standpoint, it can be considered that the insulation layer 36 is a high resistance resistor and the semiconductor layer 35 is a low resistance resistor.

It is known that a typical varistor exhibits a nonlinear resistance characteristic upon application of a so-called varistor voltage so that a resistance of the varistor drops sharply. This characteristic allows the varistor to absorb an electrical surge. Also, it is known that the varistor has a capacitance.

Like a typical varistor, the ring varistor 30 according to the first embodiment has both a nonlinear resistance characteristic and capacitances between the electrodes 31-33. The capacitances between the electrodes 31-33 can vary depending on the insulation layer 36 of the varistor body 34.

According to the first embodiment, in order to detect a rotation state of the motor 2 by using the capacitances between the electrodes 31-33 of the ring varistor 30, a capacitance of any one pair of the electrodes 31-33 is different from a capacitance of each of the other pairs of the electrodes 31-31.

Specifically, a first capacitance between the first electrode 31 and the second electrode 32 is larger than each of a second capacitance between the second electrode 32 and the third electrode 33 and a third capacitance between the third electrode 33 and the first electrode 31. Such a relationship among the capacitances between the electrodes 31-33 is hereinafter sometimes called "the unequal capacitance relationship". It is noted that the second capacitance is equal to the third capacitance.

According to the first embodiment, the above unequal capacitance relationship is achieved by causing the electrodes 31-33 to have different sizes (i.e., areas). Specifically, as can be seen from FIGS. 1A and 2B, a first size of the first electrode 31 is equal to a second size of the second electrode 32, and a third size of the third electrode 33 is smaller than each of the first size and the second size.

It is known that a capacitance between electrodes is proportional to sizes of the electrodes and inversely proportional to a distance between the electrodes. Therefore, the unequal capacitance relationship can be achieved by causing the electrodes 31-33 to have different sizes.

As shown in FIG. 1A, the first electrode 31 of the ring varistor 30 is connected to the first commutator segment 11 of the commutator 10. Thus, the first electrode 31 is electrically connected to a node between the third phase coil L3 and the first phase coil L1. The second electrode 32 of the ring varistor 30 is connected to the second commutator segment 12 of the commutator 10. Thus, the second electrode 32 is electrically connected to a node between the first phase coil L1 and the second phase coil L2. The third electrode 33 of the ring varistor 30 is connected to the third commutator segment 13 of the commutator 10. Thus, the third electrode 33 is electrically connected to a node between the second phase coil L2 and the third phase coil L3.

Next, a rotation sensor 1 for detecting the rotation state of the motor 2 is described below with reference to FIG. 3. According to the first embodiment, the rotation sensor 1 is configured to detect a rotation angle of the motor 2. The rotation sensor 1 includes a power source 5, a rotation signal generator 6, and a rotation detector 7. The power source 5 generates an alternating superimposed voltage by superimposing an alternating current (AC) voltage of a predetermined frequency on a direct current (DC) voltage. The DC voltage is used to drive the motor 2 so that the motor 2 can generate torque. The rotation signal generator 6 generates and outputs a signal (i.e., rotation pulse Sp) indicative of the rotation angle of the motor 2 based on an electric current flowing through the motor 2. The electric current flowing through the motor 2 is hereinafter sometimes called "the motor current". The rotation detector 7 detects the rotation angle of the motor 2 based on rotation pulse Sp.

Figure 4A:
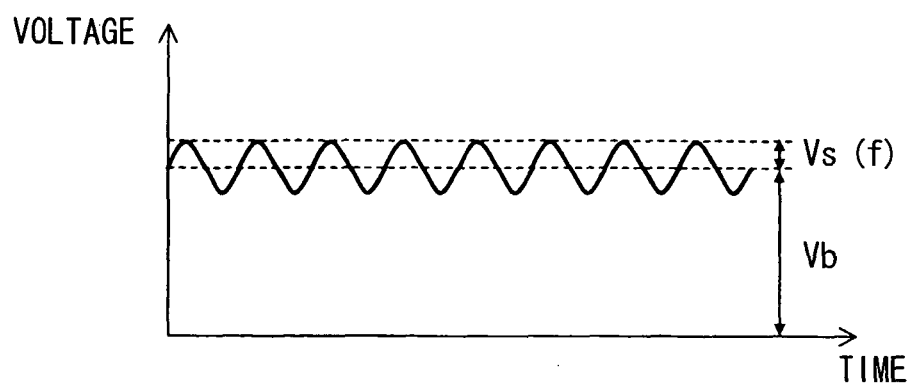
FIG. 4A is a diagram illustrating a waveform of an AC superimposed voltage outputted from a power source of the rotation sensor.

The alternating superimposed voltage outputted from the power source 5 is applied to the motor 2. As shown in FIG. 4A, the alternating superimposed voltage is a AC-DC mixed voltage (i.e., a kind of pulsating voltage) in which an AC voltage having an amplitude Vs and a frequency f is superimposed on a DC voltage Vb. Since the alternating superimposed voltage is applied to the motor 2, the motor current flowing through the motor 2 becomes an alternating superimposed current in which an AC current is superimposed on a DC current.

Figure 4B:
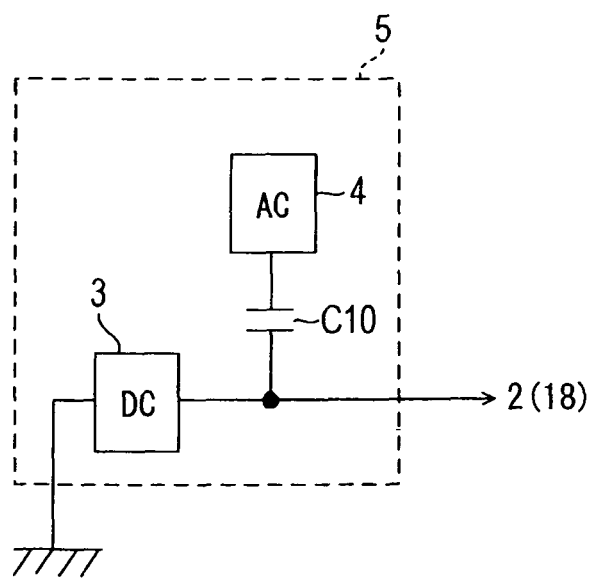
FIG. 4B is a block diagram of the power source.

The power source 5 is described in detail below with reference to FIG. 4B. The power source 5 includes a DC power supply 3, an AC power supply 4, and a coupling capacitor C10. The DC power supply 3 generates and outputs the DC voltage that is used to drive the motor 2. The AC power supply 4 generates and outputs the AC voltage that is used to detect the rotation angle of the motor 2. The coupling capacitor C10 generates the alternating superimposed voltage by superimposing the AC voltage outputted from the AC power supply 4 on the DC voltage outputted from the DC power supply 3 and applies the alternating superimposed voltage to the motor 2.

In this way, the alternating superimposed voltage having both the DC voltage from the DC power supply 3 and the AC voltage from the AC power supply 4 are applied to the motor 2. Accordingly, the alternating superimposed current having both the DC current caused by the DC voltage and the AC current caused by the AC voltage flows through the motor 2 as the motor current. In other words, the DC power supply 3 generates and supplies the DC current to the motor 2, and the AC power supply 4 generates and supplies the AC current to the motor 2.

It is noted that since the motor 2 is a DC motor, the motor 2 rotates and generates torque by a DC component (i.e., DC voltage from the DC power supply 3) of the alternating superimposed voltage, not an AC component (i.e., AC voltage from the AC power supply 4) of the alternating superimposed voltage. That is, the rotation and torque of the motor 2 does not vary depending on the AC voltage from the AC power supply 4. The AC voltage from the AC power supply 4 is applied to the motor 2 in order to detect the rotation state (i.e., angle) of the motor 2. As described later, the rotation signal generator 6 generates the rotation pulse Sp based on the AC component of the motor current flowing through the motor 2. In this way, the AC power supply 4 is included to detect the rotation state of the motor 2, not to supply power to the motor 2.

It is noted that the power source 5 can output only the AC voltage from the AC power supply 4 by preventing the DC power supply 3 to output the DC voltage. According to the first embodiment, motor braking control for stopping the rotating motor 2 is performed by interrupting the DC voltage supplied from the DC power supply 3 to the motor 2. The AC voltage from the AC power supply 4 is continuously applied to the motor 2 even during the motor braking control. That is, the AC voltage from the AC power supply 4 is continuously applied to the motor 2, at least as long the motor 2 is rotating.

Figure 3:
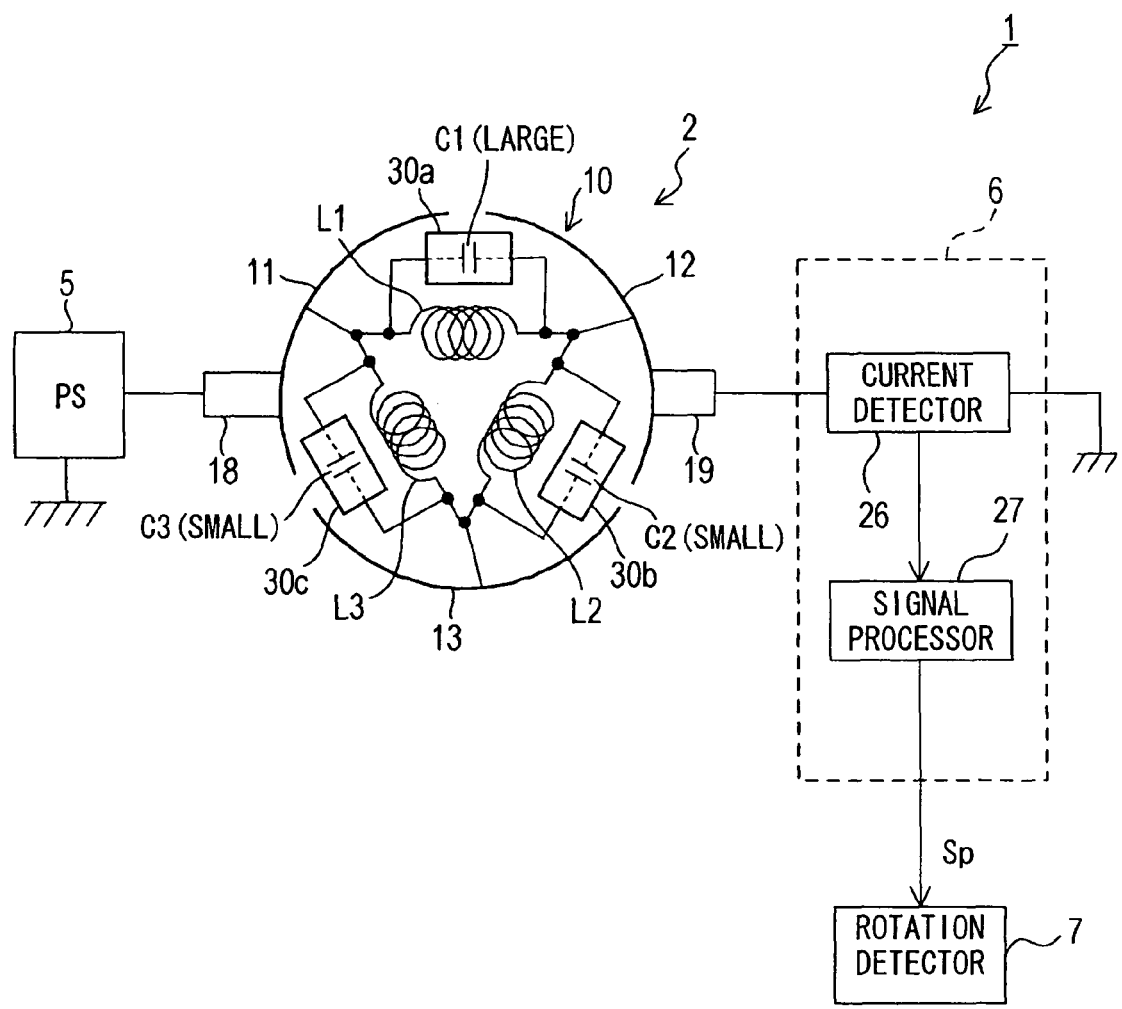
FIG. 3 is a block diagram of a rotation sensor for detecting a rotation state of the motor.

FIG. 3 shows an equivalent circuit of a motor circuit of the motor 2. The motor circuit is a circuit between the pair of brushes 18, 19 of the motor 2.

As mentioned previously, the three phase coils L1, L2, L3 are connected in a delta configuration. Further, the phase coils L1, L2, L3 are connected to the commutator segments 11, 12, 13 in a manner shown in FIG. 3. Since the motor 2 is provided with the ring varistor 30, capacitors are equivalently connected between the commutator segments 11, 12, 13.

As shown in FIGS. 1A and 1B, the first commutator segment 11 and the second commutator segment 12 are connected to the first electrode 31 and the second electrode 32 of the ring varistor 30, respectively. Therefore, a varistor component (hereinafter called "the first varistor 30a") formed between the first electrode 31 and the second electrode 32 is connected in parallel to the first phase coil L1 between the first commutator segment 11 and the second commutator segment 12.

The first varistor 30a has a capacitance, which is a capacitance between the first electrode 31 and the second electrode 32 (i.e., a capacitance between the first commutator segment 11 and the second commutator segment 12). Thus, it can be considered that a capacitor (hereinafter called "the first capacitor C1") is equivalently connected in parallel to the first phase coil L1.

The second commutator segment 12 and the third commutator segment 13 are connected to the second electrode 32 and the third electrode 33 of the ring varistor 30, respectively. Therefore, a varistor component (hereinafter called "the second varistor 30b") formed between the second electrode 32 and the third electrode 33 is connected in parallel to the second phase coil L2 between the second commutator segment 12 and the third commutator segment 13.

The second varistor 30b has a capacitance, which is a capacitance between the second electrode 32 and the third electrode 33 (i.e., a capacitance between the second commutator segment 12 and the third commutator segment 13). Thus, it can be considered that a capacitor (hereinafter called "the second capacitor C2") is equivalently connected in parallel to the second phase coil L2.

The third commutator segment 13 and the first commutator segment 11 are connected to the third electrode 33 and the first electrode 31 of the ring varistor 30, respectively. Therefore, a varistor component (hereinafter called "the third varistor 30c") formed between the third electrode 33 and the first electrode 31 is connected in parallel to the third phase coil L3 between the third commutator segment 13 and the first commutator segment 11.

The third varistor 30c has a capacitance, which is a capacitance between the third electrode 33 and the first electrode 31 (i.e., a capacitance between the third commutator segment 13 and the first commutator segment 11). Thus, it can be considered that a capacitor (hereinafter called "the third capacitor C3") is equivalently connected in parallel to the third phase coil L3.

The sizes of the electrodes 31, 32, 33 of the varistor 30 are determined in such a manner that a first capacitance of the first capacitor C1 is larger than each of a second capacitance of the second capacitor C2 and a third capacitance of the third capacitor C3 and that the second capacitance of the second capacitor C2 is equal to the third capacitance of the third capacitor C3.

It is known that a capacitor blocks a DC current while allowing an AC current to pass. Therefore, the capacitors C1, C2, C3 can be equivalently ignored from a standpoint of the DC power supply 3. Accordingly, it can be considered that the DC current from the DC power, supply 3 flows to only the phase coils L1, L2, L3. Thus, effects of the capacitors C1, C2, C3 on a rotation speed and the torque of the motor 2, which is driven by the DC current from the DC power supply 3, can be negligible.

On the other hand, from a standpoint of the AC power supply 4, the phase coils L1, L2, L3 have high impedance, and the capacitors C1, C2, C3 have low impedance. Further, as mentioned previously, the first capacitance of the first capacitor C1 is greater than each of the second capacitance of the second capacitor C2 and the third capacitance of the third capacitor C3. Therefore, every time the two of the three commutator segments 11, 12, 13 making contact with the brushes 18, 19 change with the rotation angle of the motor 2, the motor circuit between the brushes 18, 19 changes so that an impedance of the motor circuit can change. According to the first embodiment, the second capacitor C2 and the third capacitor C3 have the same capacitance value. Therefore, during 180 degree rotation of the motor 2, although the two of the three commutator segments 11, 12, 13 making contact with the brushes 18, 19 change three times, the impedance of the motor circuit changes between two different values.

Figure 5A:
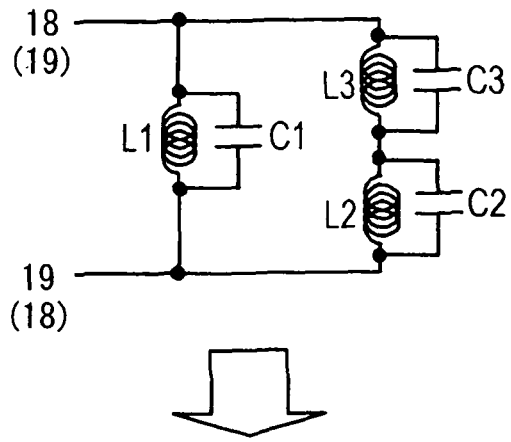
FIG. 5A is a diagram illustrating a motor circuit in a condition X1, X2.
Figure 5B:
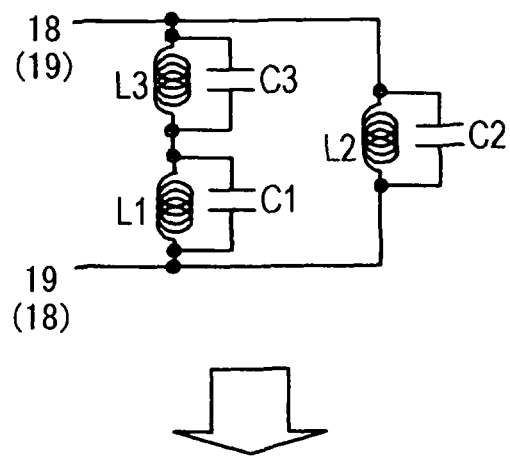
FIG. 5B is a diagram illustrating the motor circuit in a condition Y1, Y2.
Figure 5C:
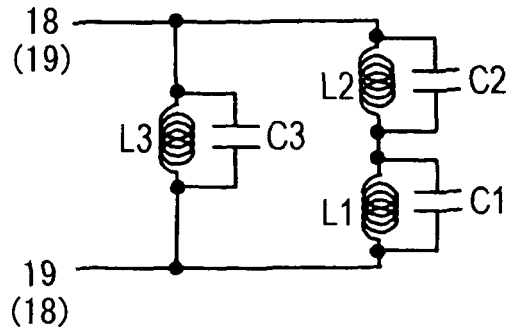
FIG. 5C is a diagram illustrating a motor circuit in a condition Z1, Z2.

FIGS. 5A-5C illustrate the change in the motor circuit between the brushes 18, 19 of the motor 2 during 180 degree rotation of the motor 2. During 180 degree rotation of the motor 2, the motor circuit changes between three different conditions including a condition X1, a condition Y1, and a condition Z1.

The motor circuit in the condition X1 is shown in FIG. 1A and FIG. 3. That is, in the condition X1, the first commutator segment 11 makes contact with the brush 18 that is connected to a positive terminal side of the DC power supply 3, and the second commutator segment 12 makes contact with the brush 19 that is connected to a ground potential side. The brush 18 connected to the positive terminal side of the DC power supply 3 is hereinafter sometimes called "the Vb-side brush 18, and the brush 19 connected to the ground potential side is hereinafter sometimes called "the GND-side brush 19".

FIG. 5A illustrates an equivalent circuit of the motor 2 in the condition X1, i.e., the motor circuit between the brushes 18, 19 in the condition X1. As can be seen form FIG. 5A, a series circuit of the third capacitor C3 and the second capacitor C2 is connected in parallel to the first capacitor C1.

The motor circuit changes from the condition X1 to the condition Y1, when the motor 2 rotates clockwise by about 60 degrees. In the condition Y1, the third commutator segment 13 makes contact with the Vb-side brush 18, and the second commutator segment 12 makes contact with the GND-side brush 19. That is, the condition Y1 differs from the condition X1 in that the third commutator segment 13 instead of the first commutator segment 11 makes contact with the Vb-side brush 18.

FIG. 5B illustrates the motor circuit in the condition Y1. As can be seen form FIG. 5B, a series circuit of the third capacitor C3 and the first capacitor C1 is connected in parallel to the second capacitor C2.

The motor circuit changes from the condition Y1 to the condition Z1, when the motor 2 rotates clockwise by about 60 degrees. In the condition Z1, the third commutator segment 13 makes contact with the Vb-side brush 18, and the first commutator segment 11 makes contact with the GND-side brush 19. That is, the condition Z1 differs from the condition Y1 in that the first commutator segment 11 instead of the second commutator segment 12 makes contact with the GND-side brush 19.

FIG. 5C illustrates the motor circuit in the condition Z1. As can be seen form FIG. 5C, a series circuit of the second capacitor C2 and the first capacitor C1 is connected in parallel to the third capacitor C3.

Below, the impedances of the motor circuit in the conditions X1, Y1, Z1 are compared with each other. As mentioned previously, the first capacitance of the first capacitor C1 is larger than each of the second capacitance of the second capacitor C2 and the third capacitance of the third capacitor C3, and the second capacitance of the second capacitor C2 is equal to the third capacitance of the third capacitor C3.

Therefore, a first impedance of the motor circuit in the condition X1 where the first capacitor C1 is not connected in series with the second capacitor C2 or the third capacitor C3 is different from each of second and third impedances of the motor circuit in the conditions Y1, Z1 where the first capacitor C1 is connected in series with the second capacitor C2 or the third capacitor C3.

Figure 6:
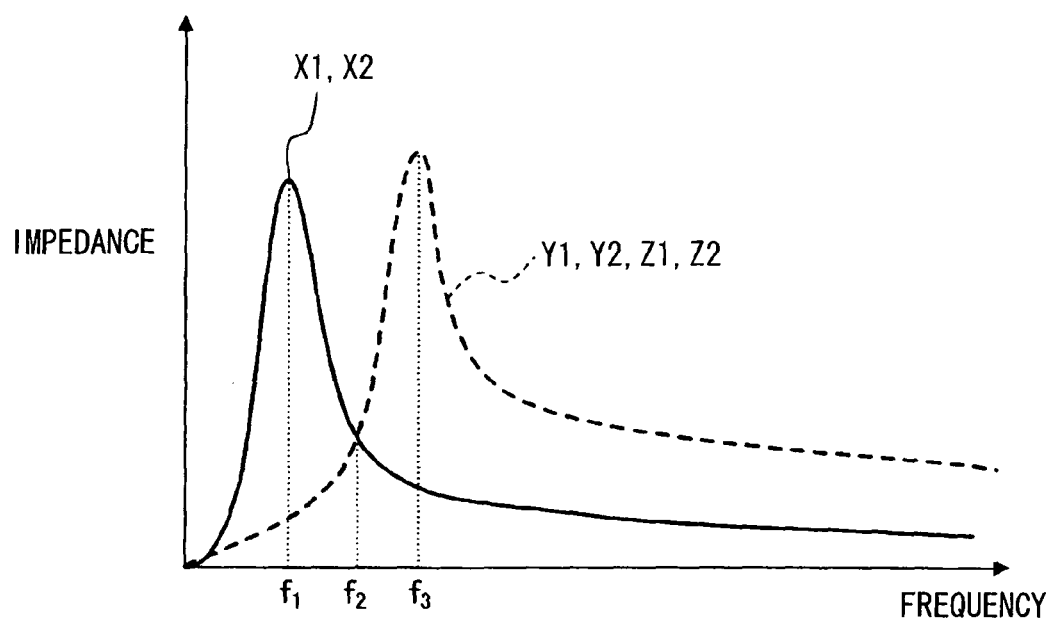
FIG. 6 is a diagram illustrating a graph of impedance frequency characteristics of the motor circuit.

FIG. 6 shows impedance frequency characteristics of the motor circuit. In FIG. 6, a solid line represents an impedance frequency characteristic curve of the motor circuit in the condition X1, and a broken line represents an impedance frequency characteristic curve of the motor circuit in each of the conditions Y1, Z1. As can be seen from FIG. 6, the impedance frequency characteristic in the condition X1 is different from the impedance frequency characteristic in each of the conditions Y1, Z1. Accordingly, a resonance frequency f1 in the condition X1 is less than a resonance frequency f3 in each of the conditions Y1, Z1. The impedance of the motor circuit is greater in the condition X1 than in each of the conditions Y1, Z1 within a frequency range less than a frequency f2 at which the impedance frequency characteristic curve in the condition X1 intersects with the impedance frequency characteristic curve in each of the conditions Y1, Z1. On the other hand, the impedance of the motor circuit is less in the condition X1 than in each of the conditions Y1, Z1 within a frequency range greater than the frequency f2.

According to the first embodiment, the frequency of the AC voltage supplied from the AC power supply 4 of the power source 5 is greater than the resonance frequency f3 in each of the conditions Y1, Z1. Therefore, the impedance of the motor circuit is less in the condition X1 than in each of the conditions Y1, Z1.

In this way, during 180 degree rotation of the motor 2, the two of the three commutator segments 11, 12, 13 making contact with the brushes 18, 19 change three times so that the motor circuit between the brushes 18, 19 can change between three different conditions including the condition X1, the condition Y1, and the condition Z1. As mentioned previously, since the impedance of the motor circuit in the condition Y1 is equal to the impedance of the motor circuit in the condition Z1, the impedance of the motor circuit changes between two different values during 180 degree rotation of the motor 2.

It is noted that there is a switching time period when one brush makes contact with adjacent two commutator segments at the same time. Strictly speaking, the impedance of the motor circuit can change during the switching time period. However, the switching time period is very short enough to be negligible compared to one rotation period of the motor 2. Therefore, the impedance change during the switching time period is not taken into considerations in the first embodiment.

In the description below, it is assumed that the motor 2 rotates further from the condition Z1. The motor circuit changes from the condition Z1 to a condition X2, when the motor 2 rotates clockwise by about 60 degrees. In the condition X2, the first commutator segment 11 remains in contact with the GND-side brush 19, and the second commutator segment 12 makes contact with the Vb-side brush 18. That is, the condition X2 differs from the condition Z1 in that the second commutator segment 12 instead of the third commutator segment 13 makes contact with the Vb-side brush 18. It is noted that the condition X2 differs from the condition X1 in that the Vb-side brush 18 and the GND-side brush 19 are interchanged with each other. Therefore, the impedance of the motor circuit in the condition X2, is equal to the impedance of the motor circuit in the condition X1.

The motor circuit changes from the condition X2 to a condition Y2, when the motor 2 rotates clockwise by about 60 degrees. In the condition Y2, the second commutator segment 12 remains in contact with the Vb-side brush 18, the third commutator segment 13 makes contact with the GND-side brush 19. That is, the condition Y2 differs from the condition X2 in that the third commutator segment 13 instead of the first commutator segment 11 makes contact with the GND-side brush 19. It is noted that the condition Y2 differs from the condition Y1 in that the Vb-side brush 18 and the GND-side brush 19 are interchanged with each other. Therefore, the impedance of the motor circuit in the condition Y2 is equal to the impedance of the motor circuit in the condition Y1.

The motor circuit changes from the condition Y2 to a condition Z2, when the motor 2 rotates clockwise by about 60 degrees. In the condition Z2, the third commutator segment 13 remains in contact with the GND-side brush 19, the first commutator segment 11 instead of the second commutator segment 12 makes contact with the Vb-side brush 18. That is, the condition Z2 differs from the condition Y2 in that the first commutator segment 11 instead of the second commutator segment 12 makes contact with the Vb-side brush 18. It is noted that the condition Z2 differs from the condition Z1 in that the Vb-side brush 18 and the GND-side brush 19 are interchanged with each other. Therefore, the impedance of the motor circuit in the condition Z2 is equal to the impedance of the motor circuit in the condition Z1.

Then, when the motor 2 rotates clockwise by about 60 degrees from the condition Z2, the motor circuit returns to the condition X1. In this way, as the motor 2 rotates, the condition of the motor circuit changes in the following order: X1, Y1, Z1, X2, Y2, Z2, X1.

That is, during one rotation of the motor 2, the motor circuit changes between six different conditions including X1, Y1, Z1, X2, Y2, and Z2. Specifically, the motor circuit switches to the next condition, every time the motor 2 rotates, by 60 degrees from the present condition. The impedance of the motor circuit is the same between the conditions Y1, Z1, Y2, and Z2. The impedance of the motor circuit is the same between the conditions X1 and X2. The impedance of the motor circuit in each of the conditions Y1, Z1, Y2, and Z2 is different from the impedance of the motor circuit in each of the conditions X1 and X2. Specifically, according to the first embodiment, the impedance of the motor circuit in each of the conditions Y1, Z1, Y2, and Z2 is greater than the impedance of the motor circuit in each of the conditions X1 and X2.

The change in the impedance of the motor circuit is directly reflected as a change in an AC component of the motor current flowing through the motor or directly reflected as a change in an AC component of a path voltage between predetermined two points on a path in which the motor current flows.

Figure 7:
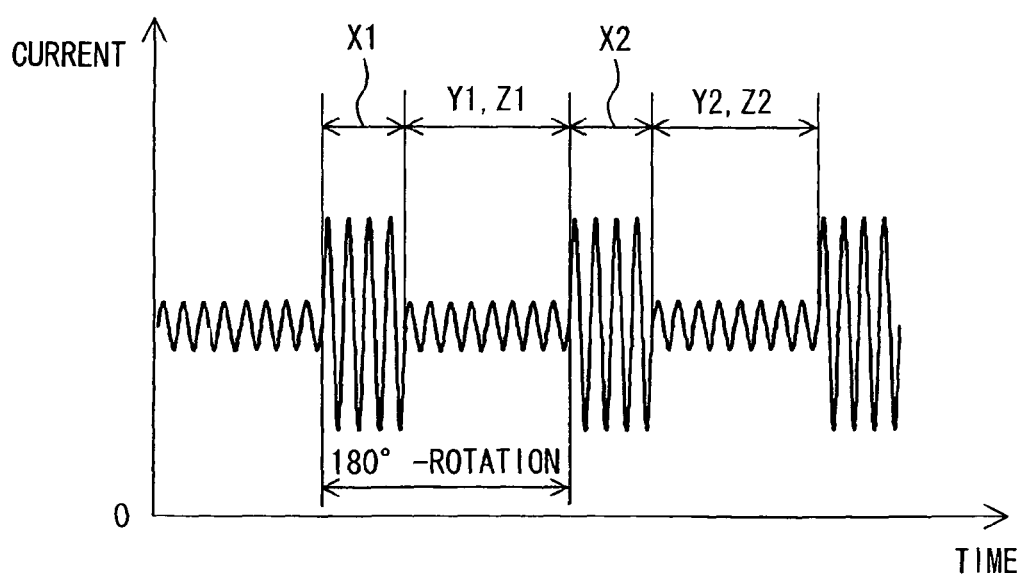
FIG. 7 is a diagram illustrating a waveform of a motor current flowing through the motor that is normally rotating.

FIG. 7 illustrates an example of the motor current flowing when the motor 2 is rotating. As shown in FIG. 7, the motor current has a waveform in which an AC current component is superimposed on a DC current component. When attention is focused on the AC current component, an amplitude of the AC current component is less in the conditions Y1, Z1, Y2, and Z2 than in the conditions X1 and X2. In this way, the amplitude of the AC current component changes between two different levels during 180 degree rotation of the motor 2.

In the rotation sensor 1 according to the first embodiment, the rotation signal generator 6 generates the rotation pulse Sp based on the change in the amplitude of the AC current component of the motor current, which results from the change in the impedance due to rotation of the motor 2.

The rotation signal generator 6 is described in detail below with reference to FIG. 8. The rotation signal generator 6 includes a current detector 26 and a signal processor 27. The current detector 26 is located on an energization path, of the motor 2 (i.e., a path from the GND-side brush 19 to the ground potential) to detect an energization current (i.e., motor current). The signal processor 27 performs signal processing on the detected motor current, thereby generating the rotation pulse Sp.

The current detector 26 has a current detection resistor R1. A voltage across the current detection resistor R1 varies depending on the motor current and is inputted as a detection signal to the signal processor 27.

The signal processor 27 includes a high-pass filter (HPF) 41, an amplifier 42, an envelope detector 43, a low-pass filter (LPF) 44, a threshold setting section 45, a comparing section 46, and a pulse generator 47.

The HPF 41 has a capacitor C11 and a resistor R2. The HPF 41 extracts frequencies of the detection signal inputted to the signal processor 27 above a predetermined cutoff frequency, including the frequency of the AC voltage generated by the AC power supply 4, by Cutting off frequencies of the detection signal below the cutoff frequency, including the DC current component. Thus, the DC current component of the detected motor current (i.e., detection signal) is blocked by HPF 41 so that only the AC current component of the detected detection signal can be inputted to the amplifier 42.

The detection signal (i.e., AC current component) extracted by the HPF 41 is amplified by the amplifier 42.

The amplifier 42 has an operational amplifier 48, a resistor R3, and a resistor R4. The resistor R3 is connected between an output terminal and a non-inverting input terminal of the operational amplifier 48. The resistor R4 is connected between the ground potential and the non-inverting input terminal of the operational amplifier 48. The detection signal extracted by the HPF 41 is inputted to an inverting input terminal of the operational amplifier 48 and amplified by a predetermined gain.

The envelope detector 43 detects the envelope of the detection signal amplified by the amplifier 42. The envelope detector 43 has a rectifier diode D1, a resistor R5, and a capacitor C12. The resistor R5 is connected to a cathode of the diode D1 at one end and connected to the ground potential at the other end. The capacitor C12 is connected to the cathode of the diode D1 at one end and connected to the ground potential at the other end. The detection signal amplified by the amplifier 42 is inputted to an anode of the diode D1.

The envelope of the detection signal amplified by the amplifier 42 is detected by the envelope detector 43 so that an envelope signal indicative of on the amplitude of the AC current component can be outputted from the envelope detector 43.

The envelope signal is filtered by the LPF 44 and then inputted to the comparing section 46. The LPF 44 has a diode D2, a resistor R6, and a capacitor C13. The diode D2 is connected in parallel to the resistor R6 in such a manner that the forward direction of the diode D2 is opposite to a direction from which the envelope signal is inputted to the LPF 44.

The comparing section 46 includes a comparator 49, a resistor R7, a resistor R8, and a resistor R9. The resistor R7 is connected to a non-inverting input terminal of the comparator 49 at one end and connected to the LPF 44 at the other end. The resistor R8 is connected to an inverting input terminal of the comparator 49 at one end and connected to threshold setting section 45 at the other end. The resistor R9 is connected between an output terminal and the inverting input terminal of the comparator 49.

The envelope signal is inputted to the comparing section 46 through the LPF 44. In the comparing section 46, the envelope signal is inputted to the non-inverting input terminal of the comparator 49 through the resistor R7. On the other hand, a threshold value is inputted from the threshold setting section 45 to the inverting input terminal of the comparator 49 through the resistor R8. Thus, the comparator 49 performs comparison between the envelope signal and the threshold value and outputs a comparison signal based on the result of the comparison.

According to the first embodiment, the threshold value is greater than the envelope signal in the conditions Y1, Z1, Y2, and Z2 and less than the envelope signal in the conditions X1 and X2. In other words, the threshold value is greater than the envelope signal during a first period of time when the motor current shown in FIG. 7 has a smaller amplitude level and less than the envelope signal during a second period of time when the motor current shown in FIG. 7 has a larger amplitude level.

Therefore, during the first period of time when the motor current has the smaller amplitude level, since the envelope signal inputted from the envelope detector 43 to the comparing section 46 is less than the threshold value inputted from the threshold setting section 45 to the comparing section 46, the comparator 49 outputs a low level signal as the comparison signal. On the other hand, during the second period of time when the motor current has the larger amplitude level, since the envelope signal inputted from the envelope detector 43 to the comparing section 46 is greater than the threshold value inputted from the threshold setting section 45 to the comparing section 46, the comparator 49 outputs a high level signal as the comparison signal.

The comparison signal outputted from the comparator 49 is inputted to the pulse generator 47. The pulse generator 47 performs signal processing, such as level-adjusting and waveform-shaping, on the inputted signal, thereby outputting the rotation pulse Sp indicative of the rotation angle of the motor 2 to the rotation detector 7.

As described above, the signal processor 27 performs various signal processing functions, including filtering, amplification, and envelope detection, on the motor current detected by the current detection resistor R1, thereby generating the rotation pulse Sp. In such an approach, disturbance and noise in the rotation signal Sp are reduced so that accuracy of the rotation signal Sp can be improved.

The HPF 41 can be replaced with a band-pass filter that passes predetermined frequencies including the frequency of the AC current component. Likewise, the LPF 44 can be replaced with such a band-pass filter. It is noted that the comparison signal (i.e., low level signal or high level signal) outputted from the comparing section 46 is a relatively stable pulse signal. Therefore, the comparison signal outputted from the comparing section 46 can be inputted directly to the rotation detector 7. In such an approach, the pulse generator 47 can be omitted.

The rotation detector 7 detects the rotation angle of the motor 2 based on the rotation pulse Sp inputted from the pulse generator 47. For example, the rotation detector 7 can detect the rotation angle of the motor 2 by detecting and counting the rising edge of the rotation pulse Sp. The detected rotation angle is used as a feedback signal in a control circuit (not shown) of the motor 2.

As mentioned previously, according to the first embodiment, the frequency of the AC voltage supplied from the AC power supply 4 is greater than the resonance frequency f3. Alternatively, the frequency of the AC voltage supplied from the AC power supply 4 can be set to any frequency except the frequency f2 at which the impedance frequency characteristic curve in the condition X1 intersects with the impedance frequency characteristic curve in each of the conditions Y1, Z1.

It is noted that the resonance frequencies f1, f3 may vary, if the capacitances of the capacitors C1, C2, and C3 vary due to various factors including ambient temperature change. Taking into considerations such a resonance frequency variation, from a circuit design standpoint, it is preferable that the frequency of the AC voltage supplied from the AC power supply 4 should be greater than the resonance frequency f3. In such an approach, even when the resonance frequency variation occurs, a change in the impedance of the motor circuit due to the resonance frequency variation is small, and also a difference between the impedance change in the conditions X1, X2 and the impedance change in the conditions Y1, Y2, Z1, and Z2 is small.

Figure 9:
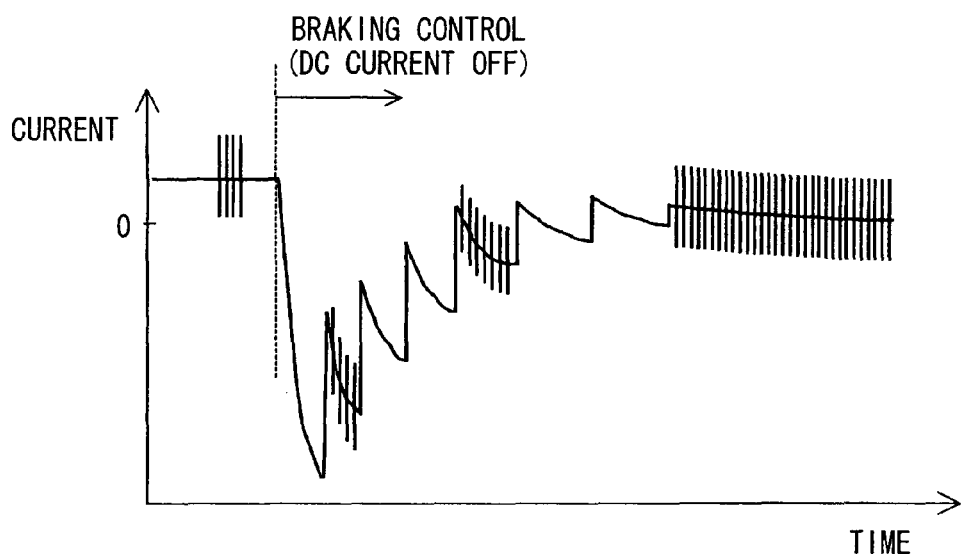
FIG. 9 is a diagram illustrating a waveform of the motor current during motor braking control.

FIG. 9 illustrates an example of a waveform of the motor current when the motor braking control for braking and stopping the rotating motor 2 is performed. It is noted that the amplitude of the AC current component during a period of time when the motor circuit is in each of the conditions Y1, Z1, Y2, and Z2 is very small due to the fact that the impedance of the motor circuit is large. Therefore, the AC current component during the period of time when the motor circuit is in each of the conditions Y1, Z1, Y2, and Z2 is omitted in FIG. 9 and FIG. 10 that will be described later.

In the example shown in FIG. 9, the DC voltage (i.e., DC current) supplied from the DC power supply 3 to the motor 2 is interrupted during the motor braking control. On the other hand, the AC voltage (i.e., AC current) is continuously supplied from the AC power supply 4 to the motor 2 regardless of whether during the motor braking control or during rotation of the motor 2, as long as the rotation of the motor 2 is being controlled. This is because the AC voltage (i.e., AC current) is used to detect the rotation angle of the motor 2, not to drive the motor 2.

Therefore, as shown in FIG. 9, after the motor braking control is started, the AC current from the AC power supply 4 is superimposed on an induced current caused by induced electromotive force so as to form the motor current. It is noted that the amplitude of the induced current is reduced with a reduction in the rotation speed of the motor 2. Then, the induced current gradually decreases and becomes zero when the motor 2 is stopped.

As mentioned above, to detect the rotation angle of the motor 2, the AC current is continuously supplied from the AC power supply 4. Therefore, as shown in FIG. 9, the amplitude of the AC current changes depending on the rotation angle of the motor 2 (i.e., depending on the impedance of the motor circuit) regardless of the rotation speed of the motor 2. Thus, the rotation angle of the motor 2 can be detected regardless of the rotation speed of the motor 2.

Figure 10:
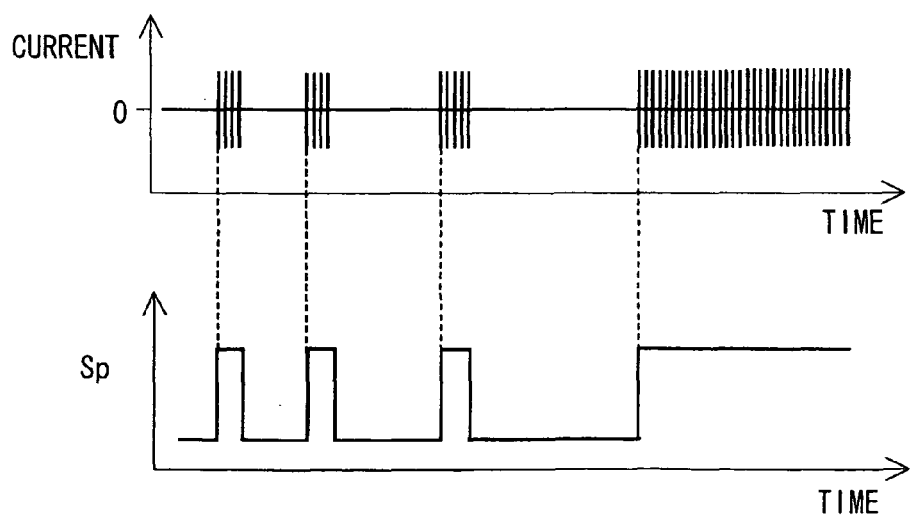
FIG. 10 is a diagram illustrating a rotation pulse generated during the motor braking control.

FIG. 10 illustrates an example of the rotation pulse Sp generated by the signal processor 27 during the motor braking control. Specifically, in FIG. 10, an upper graph represents a waveform of the detection signal outputted from the amplifier 42, and a lower graph represents a waveform of the rotation pulse Sp outputted from the pulse generator 47. According to the first embodiment, the rotation pulse Sp with a predetermined duration is generated every time the amplitude of the AC current component changes from the small amplitude level to the large amplitude level.

Further, according to the first embodiment, the rotation pulse Sp is generated every time the motor 2 rotates by 180 degrees. Therefore, the rotation angle of the motor 2 can be detected by determining that the motor 2 rotates by 180 degrees every time the rotation pulse Sp is generated.

As described above, according to the first embodiment, the rotation sensor 1 is configured as a rotation angle sensor for detecting the rotation angle of the motor 2 based on the rotation pulse Sp. Alternatively, the rotation sensor 1 can be configured as a rotation angle/speed sensor for detecting not only the rotation angle of the motor 2 but also the rotation speed of the motor 2 based on an interval between the rotation pulses Sp (e.g., the interval between the rising edges of the rotation pulses Sp). Alternatively, the rotation sensor 1 can be configured as a rotation speed sensor for detecting the rotation speed of the motor 2. Since the rotation pulse Sp is generated every time the motor 2 rotates by 180 degrees, the rotation speed of the motor 2 can be detected by detecting the interval (i.e., frequency) at which the rotation pulse Sp is outputted.

The first embodiment can be summarized as below. The rotation sensor 1 includes the AC power supply 4 for detecting the rotation angle of the motor 2 in addition to the DC power supply 3 for driving the motor 2. During a period of time when the motor 2 is controlled to rotate, the AC superimposed voltage in which the AC voltage supplied from the AC power supply 4 is superimposed on the DC voltage supplied from the DC power supply 3 is applied to the motor 2 so that the motor current having the AC component can flow through the motor 2.

The motor 2 has the ring varistor 30 with three electrodes 31, 32, and 33. The size of the third electrode 33 is different from each of the sizes of the first electrode 31 and the second electrode 32. Due to the difference in size, while the capacitor C2 and the third capacitance C3 have the same capacitance, the capacitance of the first capacitor C1 is different from the capacitance of each of the capacitors C2, C3.

Therefore, the impedance of the motor circuit between the brushes 18, 19 changes with rotation of the motor 2, and the amplitude of the AC current component of the motor current changes with the change in the impedance. The rotation sensor according to the first embodiment detects the change in the AC current-component and detects the rotation angle of the motor 2 based on the detected AC current component change.

During the motor braking control, although the DC voltage (i.e., DC current) supplied from the DC power supply 3 to the motor 2 is interrupted, the AC voltage (i.e., AC current) is continuously supplied from the AC power supply 4 to the motor 2. In such an approach, the rotation angle of the motor 2 can be surely detected even during a period of time when the motor 2 is braked and rotates at low speed. That is, the rotation angle of the motor 2 can be surely detected until the motor 2 is stopped.

Further, even after the motor 2 is stopped, the rotation state of the motor 2 can be detected by continuously applying the AC voltage to the motor 2. In such an approach, even if the motor 2 that is stopped rotates accidentally due to external force, the rotation sensor 1 can surely detect the accidental rotation of the motor 2.

The rotation angle of the motor 2 is detected based on the AC current component of the motor current without affecting the DC current component for driving the motor 2. Thus, the rotation angle of the motor 2 can be accurately detected regardless of the rotation speed of the motor 2 without using a large-scale sensor such a rotary encoder, while preventing torque variation of the motor 2.

The unequal capacitance relationship between the capacitances between the electrodes 31-33 (i.e., capacitances of the capacitors C1-C3) of the ring varistor 30 is achieved by causing the electrodes 31-33 to have different sizes. Since the unequal capacitance relationship is achieved by a simple method, an increase in cost of the ring varistor 30 can be reduced. Accordingly, an increase in the total cost of the rotation sensor 1 can be reduced.

The frequency of the AC voltage supplied from the AC power supply 4 to the motor 2 is greater than each of the resonance frequencies f1, f3 of the motor circuit between the brushes 18, 19. In such an approach, even when the capacitances between the electrodes 31-33 (i.e., capacitances of the capacitors C1-C3) of the ring varistor 30 vary due to ambient temperature change, the impedance of the motor circuit does not vary largely. Therefore, the rotation angle of the motor 2 can be accurately detected without being affected by the temperature dependence of the capacitances of the ring varistor 30.

Further, according to the first embodiment, the change in the impedance of the motor circuit caused by the rotation of the motor 2 is detected as the change in the amplitude of the AC current component of the motor circuit. The change in the amplitude is detected by the comparing section 46 having the comparator 49 after being signal processed by the HPF 41, the amplifier 42, the envelope detector 43, and the LPF 44. In such an approach, the effects of disturbance and noise on the change in the amplitude are removed by a simple method so that the change in the amplitude can be accurately detected. Accordingly, the rotation angle of the motor 2 can be accurately detected.

In the conventional method disclosed in JP 2003-111465 A, there is a high possibility that detection accuracy may be reduced due to aged deterioration of brushes and a commutator. In contrast, according to the rotation sensor 1, the rotation angle of the motor 2 is detected based on the change in the amplitude of the AC current component. Since the change in the amplitude of the AC current component depends on the impedance of the motor circuit, it is possible to reduce the effects of aged deterioration of the brushes 18, 19 and the commutator 10 on detection accuracy of the rotation sensor 1.

It is noted that the current detector 26 can serve as an energization detector and that the signal processor 27 and the rotation detector 7 can serve as a rotation state detector.

Second Embodiment

A rotation sensor according to a second embodiment of the present invention is described below with reference to FIGS. 11-15B.

Although not shown in the drawings, the rotation sensor according to the second embodiment has almost the same structure as the rotation sensor 1, shown in FIG. 3, of the first embodiment. The second embodiment differs from the first embodiment in that a motor 60 having a motor circuit shown in FIG. 12 is used instead of the motor 2. The motor 60 differs from the motor 2 in that a ring varistor 50 shown in FIG. 11 is used instead of the ring varistor 30, a signal processor 71 instead of the signal processor 27 has two comparing sections 73, 74 and two threshold setting sections 75, 76 with different threshold values, two rotation pulses are generated based on comparison results outputted from the comparing sections 73, 74, and a rotation detector 72 instead of the rotation detector 7 detects a rotation angle, a rotation direction, a rotation speed of the motor 60 based on the rotation pulses.

Figure 11:
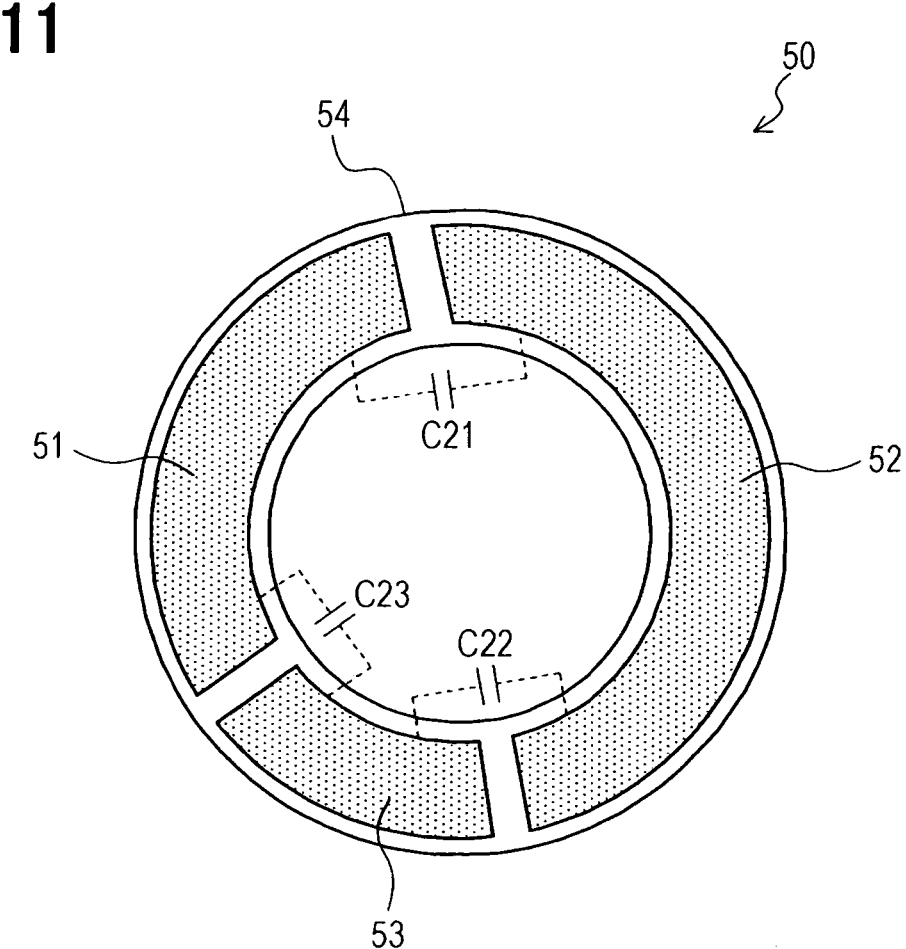
FIG. 11 is a diagram illustrating a plan view of a ring varistor of a motor according to a second embodiment of the present invention.
Figure 12:
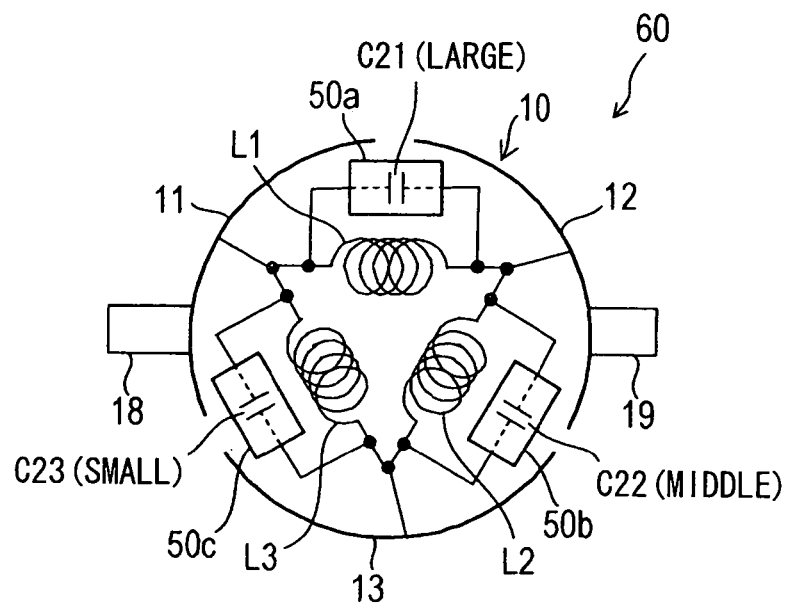
FIG. 12 is a circuit diagram of a motor circuit of the motor according to the second embodiment.

As shown in FIG. 11, the ring varistor 50 has a ring-shaped varistor body 54 with a center hole. The varistor body 54 is exactly the same as the varistor body 34 of the first embodiment and has front and back surfaces opposite to each other. The ring varistor 50 further has three electrodes 51, 52, and 53 on the front surface of the varistor body 54.

The ring varistor 50 differs from the ring varistor 30 in that each of the electrodes 51, 52, and 53 has a different size (i.e., size). Specifically, a first size of the first electrode 51 is smaller than a second size of the second electrode 52 and larger than a third size of the third electrode 53. That is, the second electrode 52 has the largest size, and the third electrode 53 has the smallest size.

As can be seen by comparing FIG. 3 and FIG. 12, the motor circuit of the motor 60 having the ring varistor 50 is basically the same as the motor circuit of the motor 2 of the first embodiment. Specifically, a first varistor 50a, a second varistor 50b, and a third varistor 50c are equivalently connected in parallel to the first phase coil L1, the second phase coil L2, and the third phase coil L3, respectively. That is, a first capacitor C21, a second capacitor C22, and a third capacitor C33 are equivalently connected in parallel to the first phase coil L1, the second phase coil L2, and the third phase coil L3, respectively.

As shown in FIG. 11, according to the second embodiment, each of the electrodes 51, 52, and 53 of the ring varistor 50 has a different size. Therefore, each of the capacitors C21, C22, and C23 has a different capacitance. Specifically, a second capacitance of the second capacitor C22 (i.e., a capacitance between the second and third electrodes 52, 53) is smaller than a first capacitance of the first capacitor C21 (i.e., a capacitance between the first and second electrodes 51, 52) and larger than a third capacitance of the third capacitor C23 (i.e., a capacitance between the first and third electrodes 51, 53). That is, the first capacitor 51 has the largest capacitance, and the third capacitor 53 has the smallest capacitance.

Therefore, during 180 degree rotation of the motor 2, the two of the three commutator segments 11, 12, 13 making contact with the brushes 18, 19 change three times so that the impedance of the motor circuit between the brushes 18, 19 can change between three different values. That is, a difference between the first and second embodiments can be summarized as follows. According to the first embodiment, during 180 degree rotation of the motor 2, although the motor circuit changes between three different conditions including the condition X1, the condition Y1, and the condition Z1, the impedance of the motor circuit changes between two different values due to the fact that the impedance of the motor circuit in the condition Y1 is the same as the impedance of the motor circuit in the condition Z1. In contrast, according to the second embodiment, during 180 degree rotation of the motor 2, the motor circuit changes between three different conditions, and the impedance of the motor circuit changes between three different values corresponding to the respective conditions.

Figure 13:
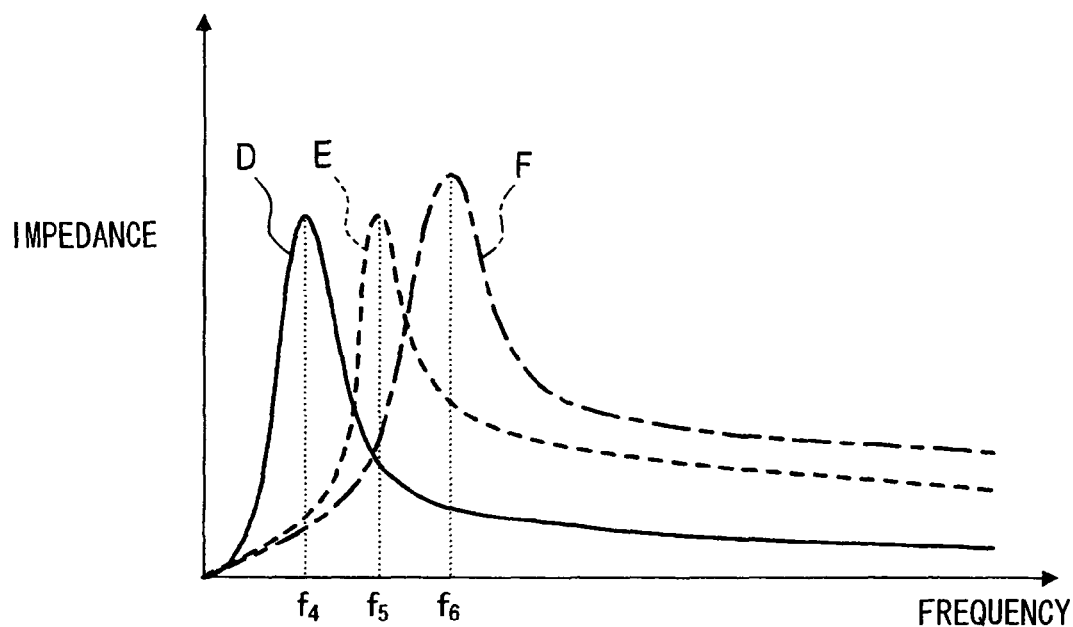
FIG. 13 is a diagram illustrating a graph of impedance frequency characteristics of the motor circuit of the motor according to the second embodiment.

FIG. 13 shows impedance frequency characteristics of the motor circuit of the motor 60 in conditions D, E, and F. In FIG. 6, a solid line represents an impedance frequency characteristic curve in the condition D, a broken line represents an impedance frequency characteristic curve in the condition E, and an alternate long and short dash line represents an impedance frequency characteristic curve in the condition F.

The condition D corresponds to the condition X1 of the first V embodiment, and the motor circuit in the condition D is shown in FIG. 12. In the condition D, the first commutator segment 11 makes contact with the Vb-side brush 18, and the second commutator segment 12 makes contact with the GND-side brush 19.

The condition E corresponds to the condition Y1 of the first embodiment. The motor circuit changes from the condition D to the condition E, when the motor 2 rotates clockwise by about 60 degrees. In the condition E, the third commutator segment 13 makes contact with the Vb-side brush 18, and the second commutator segment 12 makes contact with the GND-side brush 19.

The condition F corresponds to the condition Z1 of the first embodiment. The motor circuit changes from the condition E to the condition F, when the motor 2 rotates clockwise by about 60 degrees. In the condition F, the third commutator segment 13 makes contact with the Vb-side brush 18, and the first commutator segment 11 makes contact with the GND-side brush 19.

As can be seen from FIG. 13, a resonance frequency f5 in the condition E is greater than a resonance frequency f4 in the condition D and less than a resonance frequency f6 in the condition F. That is, the resonance frequency f6 is largest, and the resonance frequency f4 is smallest.

Figure 14:
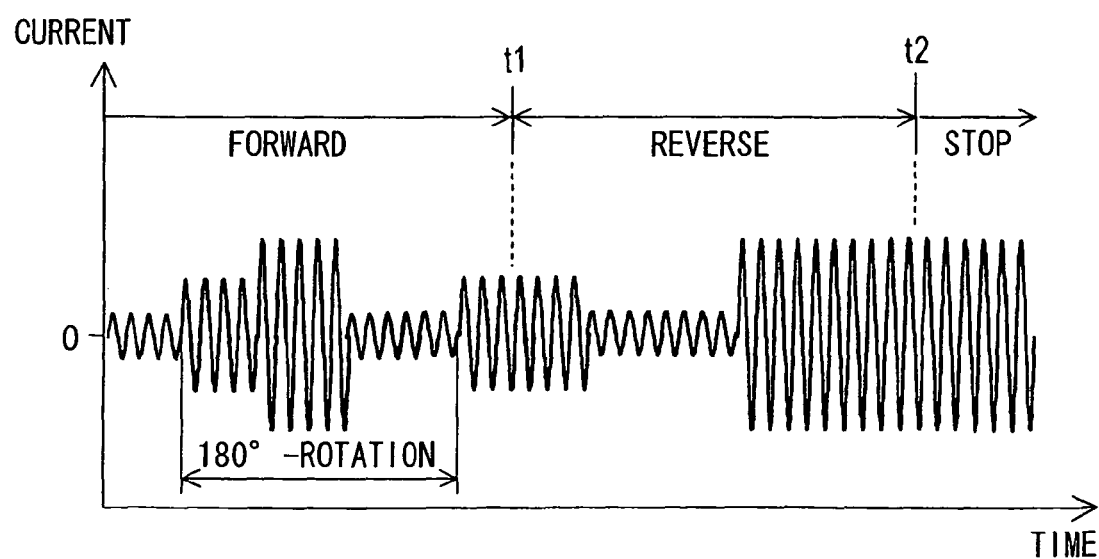
FIG. 14 is a diagram illustrating a waveform of a motor current of the motor during motor braking control according to the second embodiment.

Therefore, the AC current component of the motor current flowing through the motor 60 sequentially changes between three different levels including a small amplitude level, a middle amplitude level, and a large amplitude level, as long as the motor 60 rotates in the same direction. FIG. 14 illustrates a waveform of the AC current component of the motor current when motor braking control for braking and stopping the rotating motor 60 is performed.

As describe above, according to the second embodiment, each of the capacitors C21, C22, and C23 has a different capacitance. Therefore, as shown in FIG. 14, as long as the motor 60 rotates in the same direction, the amplitude of the AC current component of the motor current changes every time the motor 60 rotates by 60 degrees, i.e., every time the two of the three commutator segments 11, 12, 13 making contact with the brushes 18, 19 change. Therefore, the rotation angle of the motor 60 can be detected based on the change in the amplitude of the AC current component of the motor current. Specifically, the rotation angle of the motor 60 can be detected by determining that the motor 60 rotates by 60 degrees every time the amplitude of the AC current component of the motor current changes.

Figure 15A:
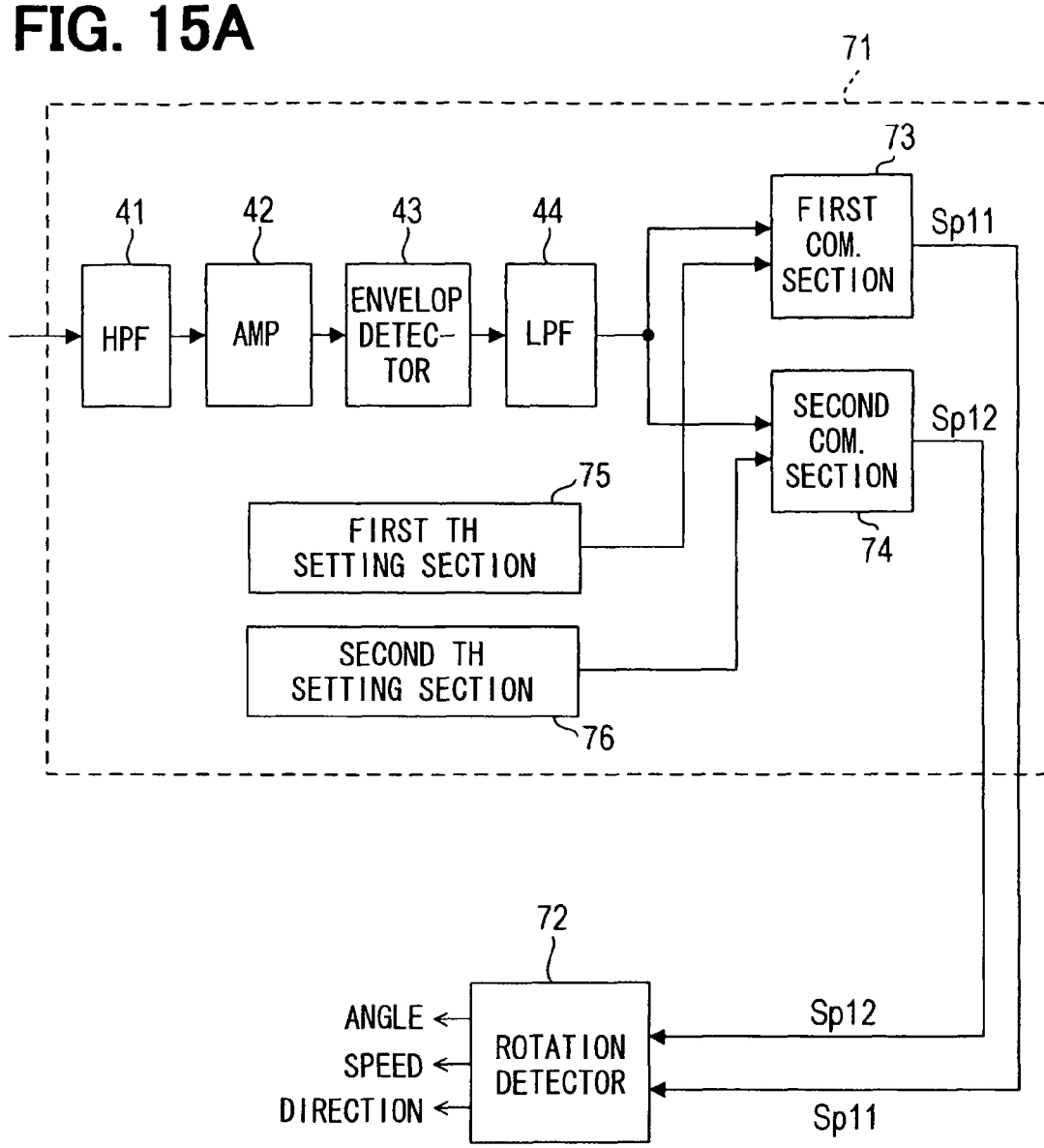
FIG. 15A is a block diagram of a signal processor of a rotation sensor for detecting a rotation state of the motor according to the second embodiment.

The signal processor 71 of the rotation sensor according to the second embodiment is described below with reference to FIG. 15A. The signal processor 71 includes two threshold setting sections 75, 76 and two comparing sections 73, 74. The first comparing section 73 and the second comparing section 74 output a first rotation pulse Sp11 and a second rotation pulse Sp12, respectively.

Figure 8:
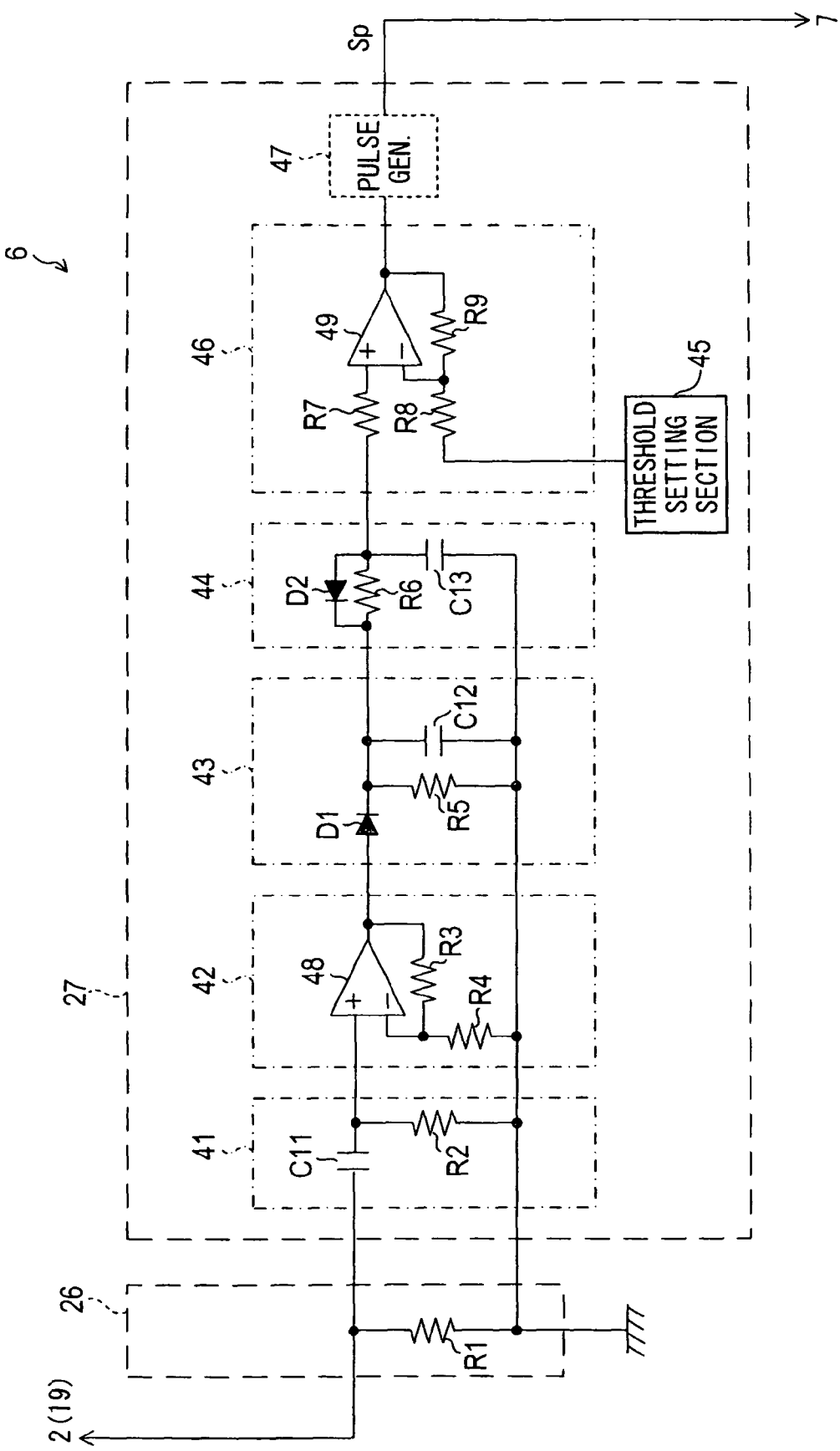
FIG. 8 is a block diagram of a rotation detector of the rotation sensor.

Like the signal processor 27 shown in FIG. 8, the signal processor 71 further includes the HPF 41, the amplifier 42, the envelope detector 43, and the LPF 44. The envelope signal outputted from the LPF 44 is inputted to each of the first comparing section 73 and the second comparing section 74.

The comparing section 73 performs first comparison between the inputted envelope signal and a first threshold value stored in the first threshold setting section 75 and outputs the first rotation pulse Sp11 based on the result of the first comparison.

The comparing section 74 performs second comparison between the inputted envelope signal and a second threshold value stored in the second threshold setting section 76 and outputs the second rotation pulse Sp12 based on the result of the second comparison.

In the discussion below, the envelope signal outputted from the envelope detector 43 when the AC current component of the detection signal has the small amplitude level is hereinafter defined as "the small envelope signal", the envelope signal outputted from the envelope detector 43 when the AC current component of the detection signal has the middle amplitude level is hereinafter defined as "the middle envelope signal", and the envelope signal outputted from the envelope detector 43 when the AC current component of the detection signal has the large amplitude level is hereinafter defined as "the large envelope signal". In this case, the first threshold value is set to a value greater than the small envelope signal and less than the middle envelope signal, and the second threshold value is set to a value greater than the middle envelope signal and less than the large envelope signal.

Therefore, when the first comparing section 73 compares the envelope signal inputted from the envelope detector 43 with the first threshold value inputted from the first threshold setting section 75 and determines that the inputted envelope signal is less than the first threshold value, the inputted envelope signal is considered the small envelope signal. In contrast, if the inputted envelope signal is greater than the first threshold value, it is estimated that the inputted envelope signal is the middle envelope signal or the large envelope signal. In this case, when the second comparing section 74 compares the envelope signal inputted from the envelope detector 43 with the second threshold value inputted from the second threshold setting section 76 and determines that the inputted envelope signal is less than the second threshold value, the inputted envelope signal is considered the middle envelope signal. In contrast, if the inputted envelope signal is greater than the second threshold value, the inputted envelope signal is considered the large envelope signal.

Figure 15B:
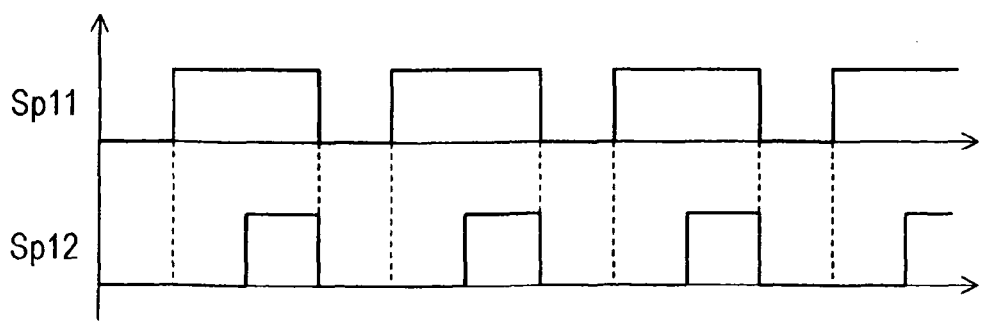
FIG. 15B is a diagram illustrating a rotation pulse outputted from the signal processor.

In this way, the first threshold value and the second threshold value are set so that it can be determined whether the envelope signal is the small envelope signal, the middle envelope signal, or the large envelope signal. In such an approach, the rotations pulses Sp1, Sp2 can be generated every time the two of the three commutator segments 11, 12, 13 making contact with the brushes 18, 19 change, i.e., every time the motor circuit changes from one condition to another condition. Therefore, the rotation angle can be detected at high resolution compared to the first embodiment. FIG. 15B illustrates an example of the rotations pulses Sp11, Sp12.

Further, according to the second embodiment, during 180 degree rotation of the motor 60, the amplitude of the AC current component changes between three different amplitude levels including the small amplitude level, the middle amplitude level, and the large amplitude level, every time the two of the three commutator segments 11, 12, 13 making contact with the brushes 18, 19 change. Therefore, the rotation direction of the motor 60 can be detected based on a pattern in which the amplitude of the AC current component changes between the different amplitude levels.

FIG. 14 illustrates a waveform of the AC current component of the motor current when the motor 60 rotates in reverse direction at a time t1 immediately before the motor 60 is stopped during the motor braking control.

Assuming that the motor 60 is normally stopped without the reverse rotation at the time t1, the amplitude of the AC current component remains the middle amplitude level or changes to the large amplitude level.

In contrast, as shown in FIG. 14, if the reverse rotation occurs at the time t1, the amplitude of the AC current components returns to the small amplitude level from the middle amplitude level, and then changes to the large amplitude level from the small amplitude level. That is, the amplitude change pattern in the reverse rotation is opposite to the amplitude change pattern in the forward rotation. In an example of FIG. 14, since the motor 60 is completely stopped at a time t2, the amplitude of the AC current component of the motor current is kept at the large amplitude level after the time t2.

In this way, according to the second embodiment, the rotation direction of the motor 60 can be detected based on how the amplitude of the AC current component changes. For example, in the example of FIG. 14, the amplitude of the AC current component changes from the middle amplitude level to the small amplitude level after the time t1. Therefore, based on the amplitude change from the middle amplitude level to the small amplitude level, it can be detected that the rotation direction of the motor 60 is reversed.

The rotation detector 72 detects the rotation angle, the rotation speed, and the rotation direction of the motor 60 based on the first and second rotation pulses Sp11, Sp12 generated by the signal processor 71. It is noted that the rotation speed of the motor 60 can be detected based on intervals (i.e., frequencies) at which the first and second rotation pulses Sp11, Sp12 are outputted.

As described above, according to the second embodiment, each the capacitances between the electrodes of the ring varistor 50 of the motor 60 has a different value. In such an approach, every time the two of the three commutator segments 11, 12, 13 making contact with the brushes 18, 19 change with rotation of the motor 60, the amplitude of the AC current component changes between the different amplitude levels. Therefore, the rotation angle of the motor 60 can be detected at high resolution. Further, in addition to the rotation angle and the rotation speed of the motor 60, the rotation direction of the motor 60 can be detected. Thus, the reverse rotation, which is likely to occur immediately before the motor 60 is stopped, can be surely detected. In this way, the rotation state of the motor 60 including the rotation direction can be accurately detected.

Modifications

The embodiments described above can be modified in various ways, for example, as follows.

The varistor body has a disk shape with a center hole. That is, the varistor body has four surfaces including the front surface, the back surface, an outer side surface, and an inner side surface (i.e., inner surface of the center hole). According to the above embodiments, the electrodes are formed on only the front surface of the varistor body.

Alternatively, the electrodes can be formed on any one of the four surfaces of the varistor body. Alternatively, any one of the electrodes can be formed on any one of the four surfaces of the varistor body, and the others of the electrodes can be formed on any one of the others of the four surfaces of the varistor body. Alternatively, the electrodes can be formed over adjacent surfaces of the varistor body. In this way, the electrodes can be arranged on the surfaces of the varistor body in various manners.

Figure 16A:
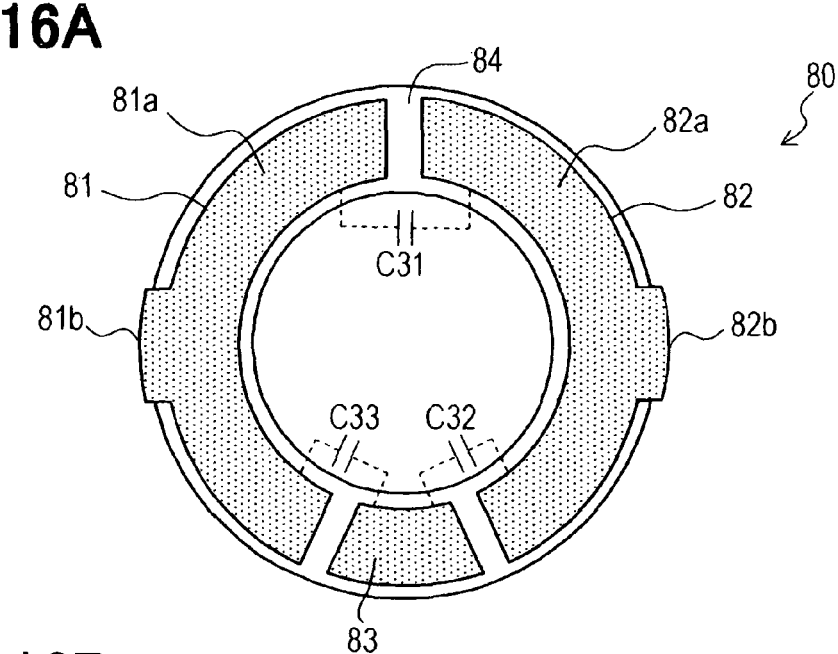
FIG. 16A is a diagram illustrating a top view of a ring varistor of a motor according to a first modification of the embodiments.
Figure 16B:
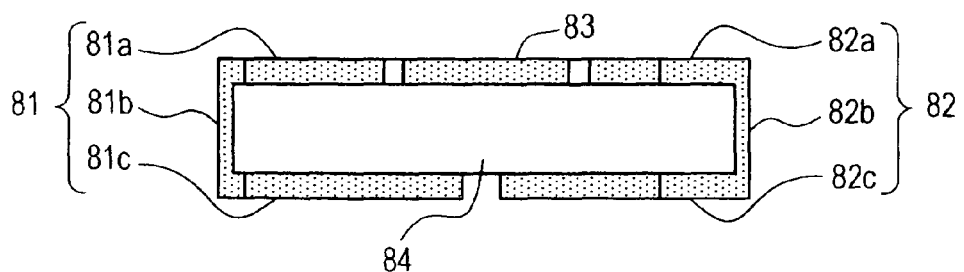
FIG. 16B is a diagram illustrating a side view of the ring varistor of the motor according to the first modification.
Figure 16C:
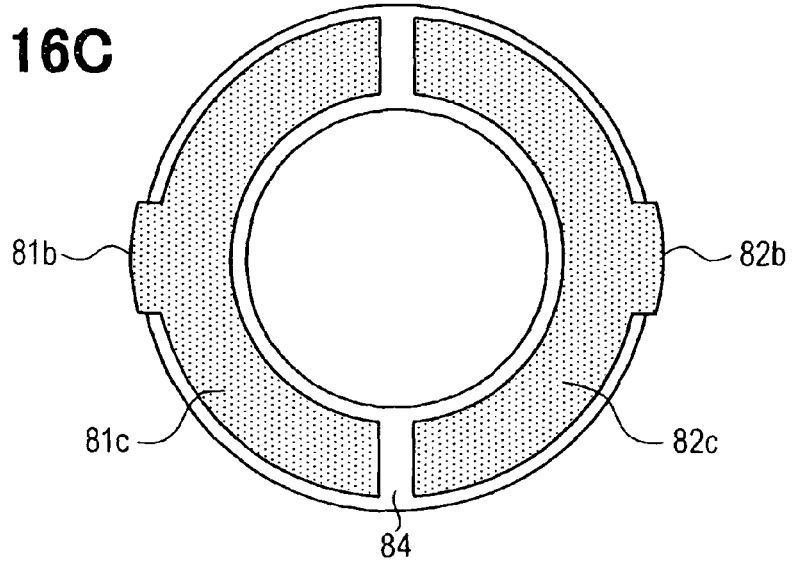
FIG. 16C is a diagram illustrating a bottom view of the ring varistor of the motor according to the first modification.

FIGS. 16A-16C show a ring varistor 80 in which each of two of three electrodes 81, 82, and 83 is formed over adjacent surfaces of a varistor body 84. FIG. 16A is a top view of the ring varistor 80, FIG. 16B is a side view of the ring varistor 80, and FIG. 16C is a bottom view of the ring varistor 80. It is noted that the varistor body 84 is exactly the same as the varistor body 34 of the ring varistor 30 of the first embodiment.

As shown in FIG. 16A, the third electrode 83 is formed on the front surface of the varistor body 84. In contrast to the third electrode 83, each of the first electrode 81 and the second electrode 82 is formed over adjacent surfaces of the varistor body 84. Specifically, the first electrode 81 includes a first front electrode 81a, a first side electrode 81b, and a first back electrode 81c. The first front electrode 81a is formed on the front surface of the varistor body 84, the first side electrode 81b is formed on the outer side surface of the varistor body 84, and the first back electrode 81c is formed on the back surface of the varistor body 84. The first front electrode 81a, the first side electrode 81b, and the first back electrode 81c are integrally formed as a single piece to define the first electrode 81.

Like the first electrode 81, the second electrode 82 includes a second front electrode 82a, a second side electrode 82b, and a second back electrode 82c. The second front electrode 82a is formed on the front surface of the varistor body 84, the second side electrode 82b is formed on the outer side surface of the varistor body 84, and the second back electrode 82c is formed on the back surface of the varistor body 84. The second front electrode 82a, the second side electrode 82b, and the second back electrode 82c are integrally formed as a single piece to define the second electrode 82.

In the ring varistor 80 shown in FIGS. 16A-16C, each of the first and second electrodes 81, 82 is continuously formed over three surfaces of the varistor body 84. In such an approach, each of the first and second electrodes 81, 82 can have a larger size. Thus, a difference in size between the third electrode 83 and each of the first and second electrode 81, 82 can be increased.

In the ring varistor 80, capacitors C31, C32, C33 are equivalently connected in parallel to the phase coils L1, L2, L3. Like the first embodiment, a first capacitance of the first capacitor C31 is larger than each of a second capacitance of the second capacitor C32 and a third capacitance of the third capacitor C33, and the second capacitance of the second capacitor C32 is equal to the third capacitance of the third capacitor C33. It is noted that a difference in capacitance between the first capacitor C31 and each of the second and third capacitors C32, C33 is much larger than a difference in capacitance between the first capacitor C1 and each of the second and third capacitors C2, C3 of the first embodiment.

Therefore, when the ring varistor 80 is used instead of the ring varistor 30 in the first embodiment, the difference in impedance of the motor circuit between each of in the conditions X1, X2 and each of in the conditions Y1, Y2, Z1, and Z2 becomes larger. Accordingly, the change in the amplitude of the AC current component becomes larger so that the rotation state of the motor 2 can be detected more accurately.

The ring varistor 50 of the second embodiment can be modified in the same manner as discussed above for the ring varistor 30 so that a difference in size between the electrodes 51, 52, and 53 can be increased. In such an approach, the rotation state (in particular, rotation direction) of the motor 60 can be detected more accurately.

In the embodiments, the capacitances between the electrodes of the ring varistor are made different from each other by causing each of the electrodes to have a different size. Alternatively, the capacitances between the electrodes of the ring varistor can be made different from each other in another way.

For example, as shown in FIG. 17, an insulation layer of a ring varistor 90 can have thickness variations so that capacitances between electrodes 91, 92, and 93 can be different from each other. In the varistor 90, each of the electrodes 91, 92, and 93 is formed on the front surface of a varistor body 94 and has the same size.

Figure 17A:
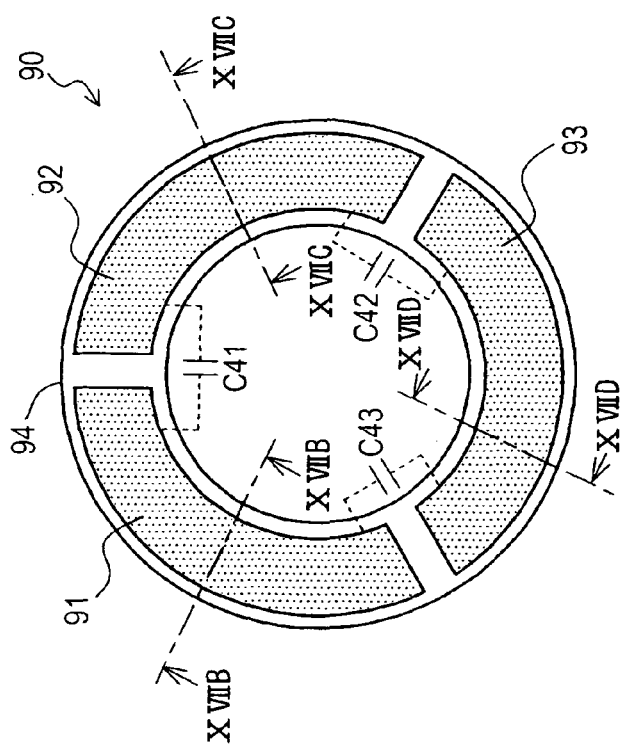
FIG. 17A is a diagram illustrating a top view of a ring varistor of a motor according to a second modification of the embodiments.
Figure 17D:
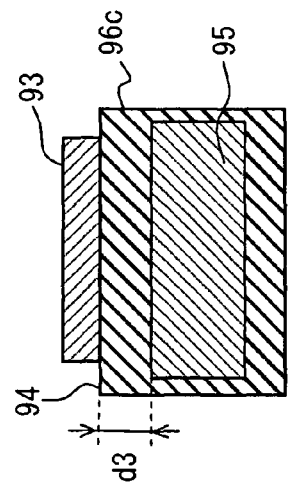
FIG. 17D is a diagram illustrating a cross-sectional view taken along the line XVIID-XVIID in FIG. 17A.
Figure 17C:
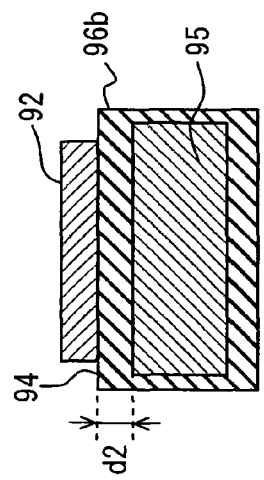
FIG. 17C is a diagram illustrating a cross-sectional view taken along the line XVIIC-XVIIC in FIG. 17A.
Figure 17B:
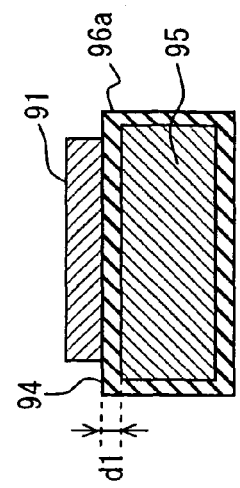
FIG. 17B is a diagram illustrating a cross-sectional view taken along the line XVIIB-XVIIB in FIG. 17A.

As shown in FIG. 17B, a first insulation layer 96a having a first thickness d1 is formed between the first electrode 91 and a semiconductor layer 95 of the varistor body 94. As shown in FIG. 17C, a second insulation layer 96b having a second thickness d2 is formed between the second electrode 92 and the semiconductor layer 95 of the varistor body 94. As shown in FIG. 17C, a third insulation layer 96c having a third thickness d3 is formed between the third electrode 93 and the semiconductor layer 95 of the varistor body 94. The thicknesses d1, d2, and d3 of the insulation layers 96a, 96b, and 96c are different from each other. Specifically, the second thickness d2 is larger than the first thickness d1 and less than the third thickness d3 (i.e., d1<d2<d3).

Accordingly, each of capacitors C41, C42, and C43 that are equivalently connected in parallel to the phases coils L1, L2, L3 has a different capacitance value despite the fact that each of the electrodes 91, 92, and 93 has the same size. Thus, the ring varistor 90 can have the same characteristics as the ring varistor 50 of the second embodiment.

In this way, the characteristics of the ring varistor 90 can be adjusted by adjusting the thickness of the insulation layer between the electrodes and the varistor body 94. For example, the ring varistor 90 can have the same characteristics as the ring varistor 30 of the first embodiment.

It is noted that the electrodes can have different sizes while the insulation layer has the thickness variations.

In the embodiments, the motor is provided with one ring varistor. Alternatively, the motor can be provided with two or more ring varistors.

For example, when the motor 2 of the first embodiment is provided with two ring varistors 30, the commutator 10 is connected to the electrodes of each ring varistor 30 in the same manner as described in the first embodiment.

Specifically, the first commutator segment 11 is connected to the first electrode 31 of each ring varistor 30, the second commutator segment 12 is connected to the second electrode 32 of each ring varistor 30, and the third commutator segment 13 is connected to the third electrode 33 of each ring varistor 30.

In such an approach, the change in the capacitance between the brushes 18, 19 during rotation of the motor 2 is increased as compared to when the motor 2 is provided with one ring varistor 30. Thus, the rotation state of the motor 2 can be detected more accurately. The number of ring varistors and how to connect the commutator 10 to each ring varistor can be adjusted as necessary.

In the embodiments, the varistor body has a disk shape. The shape of the varistor body is not limited to a disk shape, as long as the ring varistor has a ring shape as a whole. For example, the varistor body can have a doughnut shape, a polygonal disk shape, or the like.

In the embodiments, the phase coils L1, L2, L3 are connected in a delta configuration. Alternatively, the phase coils L1, L2, L3 can be connected in a star configuration.

In the embodiments, the motor is configured as a three-phase DC motor. Alternatively, the motor can be configured as a four or more phase DC motor.

For example, in the case, of a five-phase DC motor, the ring varistor needs to have five electrodes. In this case, capacitances between the electrodes of the ring varistor are made different from each other so that the impedance of the motor circuit can change between two or more different values during 180 rotation of the motor.

Figure 18:
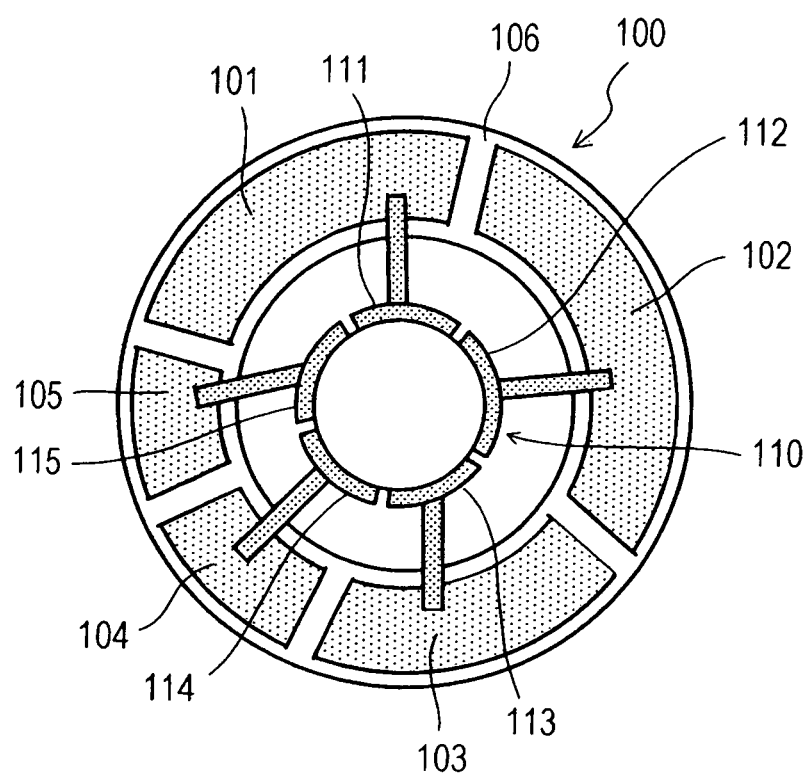
FIG. 18 is a diagram illustrating a top view of a ring varistor of a motor according to a third modification of the embodiments.

FIG. 18 illustrates a case where the present invention is applied to a five-phase DC motor. It is noted that FIG. 18 shows only a commutator 110 and a ring varistor 100 of the five-phase motor. The commutator 110 has five commutator segments including a first commutator segment 111, a second commutator segment 112, a third commutator segment 113, a fourth commutator segment 114, and a fifth commutator segment 115.

The ring varistor 100 has five electrodes including a first electrode 101, a second electrode 102, a third electrode 103, a fourth electrode 104, and, a fifth electrode 105. Each of the first electrode 101, the second electrode 102, and the third electrode 103 has the same size. Each of the fourth electrode 104 and the fifth electrode 105 has the same size. The size of each of the first electrode 101, the second electrode 102, and the third electrode 103 is larger than the size of each of the fourth electrode 104 and the fifth electrode 105.

The first electrode 101 is connected to the first commutator segment 111, the second electrode 102 is connected to the second commutator segment 112, the third electrode 103 is connected to the third commutator segment 113, the fourth electrode 104 is connected to the fourth commutator segment 114, and the fifth electrode 105 is connected to the fifth commutator segment 115.

In such a configuration, two of the five commutator segments 111-115 making contact with a pair of brushes (not shown) change as follows during 180 rotation of the five-phase motor. For example, it is assumed that the first and third commutator segments 111, 113 make contact with the pair of brushes at this time, so that the first and third electrodes 101, 103 are connected to the brushes through the first and third commutator segments 111, 113. Then, when the motor rotates, the fifth and third commutator segments 115, 113 make contact with the pair of brushes, so that the fifth and third electrodes 105, 103 are connected to the brushes through the fifth and third commutator segments 115, 113. Then, when the motor further rotates, the fifth and second commutator segments 115, 112 make contact with the pair of brushes, so that the fifth and second electrodes 105, 102 are connected to the brushes through the fifth and second commutator segments 115, 112. Then, when the motor further rotates, the fourth and second commutator segments 114, 112 make contact with the pair of brushes, so that the fourth and second electrodes 104, 102 are connected to the brushes through the fourth and second commutator segments 114, 112. Then, when the motor further rotates, the fourth and first commutator segments 114, 111 make contact with the pair of brushes, so that the fourth and first electrodes 104, 101 are connected to the brushes through the fourth and first commutator segments 114, 111.

Therefore, during 180 degree rotation of the motor, a capacitance between the pair of brushes changes between at least two different values including a large value and a small value. Specifically, in a condition where the first and third commutator segments 111, 113 make contact with the pair of brushes (i.e., when the first and third electrodes 101, 103 are connected to the brushes), the capacitance between the pair of brushes is large because of the fact that each of the electrodes connected to the brushes has a large size. In contrast, in the other conditions, the capacitance between the pair of brushes is small because of the fact that one (i.e., the fourth electrode 104 or the fifth electrode 105) of the electrodes connected to the brushes has a small size.

Therefore, like the embodiments described above, the rotation angle of the five-phase motor can be detected based on the capacitance change (i.e., impedance change between the brushes) between at least two different values during 180 degree rotation of the motor.

That is, the impedance between the brushes can change between multiple different values with rotation of the motor regardless of the number of the phase coils of the armature coil, when the capacitances between the electrodes of the ring varistor are made different from each other. Accordingly, the AC current component of the motor current can change between different amplitude levels with rotation of the motor. Thus, the rotation state (i.e., at least one of the rotation angle, rotation direction, and rotation speed) of the motor can be detected based on the change in the AC current component.

In the embodiments, the ring varistor as a whole has a disc shape that is perfectly circular. Alternatively, the ring varistor can have a shape other than a perfectly circular shape. For example, the ring varistor can have an ellipsoidal shape, a polygonal outer shape, or the like. It is not always required that the rotating shaft of the motor and the center of the ring varistor coincide with each other. The positional relationship between the rotating shaft of the motor and the center of the ring varistor can be adjusted as necessary.

In the embodiments, the ring varistor has a closed ring shape with no gap. The ring varistor can have a shape other than a closed ring shape. For example, as shown in FIGS. 19A and 19B, the ring varistor can have a C-shape with a gap.

Figure 19A:
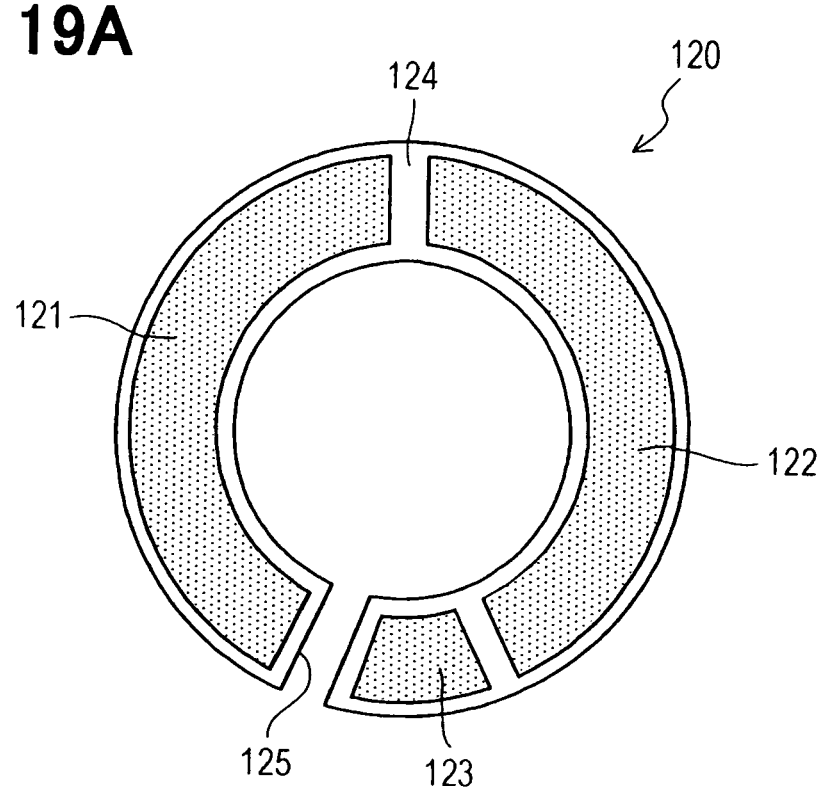
FIG. 19A is a diagram illustrating a top view of a ring varistor of a motor according to a fourth modification of the embodiments.

A ring varistor 120 shown in FIG. 19A has a first electrode 121, a second electrode 122, a third electrode 123, and a C-shaped varistor body 124. The three electrodes 121-123 are formed on a front surface of the varistor body 124. A first size of the first electrode 121 is equal to a second size of the second electrode 122, and a third size of the third electrode 123 is smaller than each of the first size and the second size. A gap 125 is formed between ends of the varistor body 124 so that the varistor body 124 can have a C-shape.

Figure 19B:
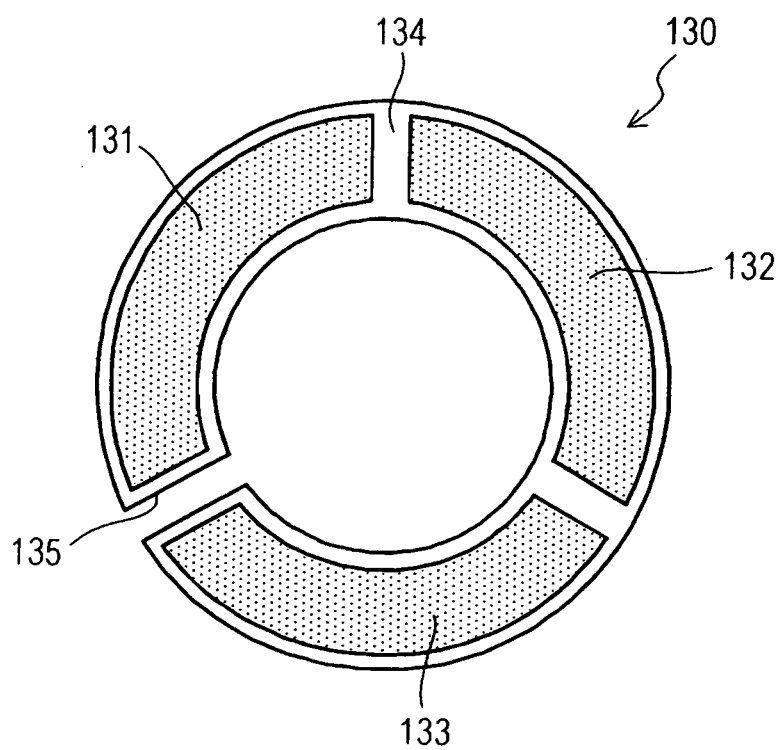
FIG. 19B is a diagram illustrating a top view of a ring varistor of a motor according to a fifth modification of the embodiments.

A ring varistor 130 shown in FIG. 19B is almost the same as the ring varistor 120 shown in FIG. 19A except for the electrode size. Specifically, the ring varistor 130 has a first electrode 131, a second electrode 132, a third electrode 133, and a C-shaped varistor body 134. The three electrodes 131-133 are formed on a front surface of the varistor body 124. Unlike the electrodes 121-123 of the ring varistor 120, each of the electrodes 131-133 of the ring varistor 130 has the same size. A gap 135 is formed between ends of the varistor body 134 so that the varistor body 134 can have a C-shape. Although each of the electrodes 131-133 of the ring varistor 130 has the same size, the impedance between the brushes changes between at least two different values with rotation of the motor due to the fact that the varistor body 134 has a C-shape.

Since the ring varistors 120, 130 shown in FIGS. 19A, 19B are only examples of a ring varistor that is not closed ring shape. The shape of the ring varistor is not limited to the shape shown in FIGS. 19A, 19B.

In the embodiments, because of the ring varistor, the capacitance between the brushes can change with rotation of the motor. In addition to the capacitance, an inductance between the brushes can change with rotation of the motor. In such an approach, the impedance between the brushes can change largely with rotation of the motor. For example, an inductor is connected in series or parallel with any one (or two) of the phase coils of the motor. Alternatively, the number of turns of any one of the phase coils is made different from the number of turns of the other coils of the motor.

For example, in the case of the motor 2 of the first embodiment, an inductance of the first phase coil L1 can be increased by increasing the number of turns of the first phase coil L1 beyond the number of turns of each of the second phase coil L2 and the third phase coil L3. In such an approach, the resonance frequency f1 (refer to FIG. 6) of the parallel circuit of the first phase coil L1 and the first capacitor C1 in the condition X1 can be lowered. Thus, the difference between the resonance frequencies f1, f3 becomes larger so that the impedance change can become larger.

It is noted that the change in inductance of the phase coil of the motor may cause motor torque variations, if the inductance change is large (i.e., difference in the number of turns is large). Therefore, it is preferable that the inductance between the brushes be adjusted in such a manner that so that motor torque variations can be prevented as much as possible.

In the embodiments, the impedance change during the switching time period when one brush makes contact with adjacent two commutator segments at the same time is not taken into considerations. It is noted that the rotation state of the motor can be detected based on the impedance change during the switching time period. In this case, it is not always necessary that the electrodes of the ring varistor have different sizes. That is, the rotation state of the motor can be detected based on the impedance change during the switching time period by using a ring varistor that includes electrodes having the same size and has the same capacitance value between the electrodes.

In the embodiments, as shown in FIG. 4, the AC power supply 4 generates a sine-wave voltage with the amplitude Vs. The AC power supply 4 can generate an AC voltage other than a sine-wave voltage. For example, the AC power supply 4 can generate a square-wave voltage.

Such changes and modifications are to be understood as being within the scope of the present invention as defined by the appended claims.

What is claimed is:

1. A rotation sensor in combination with a direct current motor, the combination comprising:
   an armature coil including at least three phase coils;
   a commutator having a plurality of commutator segments connected to the armature coil;
   a pair of brushes in slidable contact with the commutator to supply power to the phase coils through the commutator;
   a rotation shaft;
   a ring varistor coaxially fixed to the rotation shaft and including a ring-shaped varistor body and a plurality of electrodes that are circumferentially arranged on a surface of the varistor body;
   a power source configured to generate an alternating superimposed voltage by superimposing a direct current voltage on an alternating current voltage and apply the alternating superimposed voltage between the pair of brushes;
   an energization detector configured to detect at least one of a motor current and a path voltage, the motor current flowing to the motor through the pair of brushes, the path voltage being a voltage between predetermined two points on a path in which the motor current flows; and a rotation state detector configured to detect a rotation state of the motor based on an alternating current component of the detected motor current or the detected path voltage, the rotation state including at least one of a rotation angle, a rotation direction, and a rotation speed of the motor, wherein each of the plurality of commutator segments of the commutator is connected to a corresponding one of the plurality of electrodes of the ring varistor, the plurality of electrodes of the ring varistor is paired to form a plurality of electrode pairs, each electrode pair comprising any two of the plurality of electrodes, a first one of the plurality of electrode pairs has a first capacitance therebetween, a second one of the plurality of electrode pairs has a second capacitance therebetween, and the first capacitance is different from the second capacitance.

2. The combination according to claim 1, wherein each electrode pair is connected to a corresponding pair of the plurality of commutator segments, and the pair of brushes makes contact with the corresponding pair of the plurality of commutator segments at the same time during one rotation of the motor.

3. The combination according to claim 1, wherein a third one of the plurality of electrode pairs has a third capacitance therebetween, and the third capacitance is different from each of the first capacitance and the second capacitance.

4. The combination according to claim 1, wherein a first one of the plurality of electrodes has a first size, a second one of the plurality of electrodes has a second size different from the first size, and a difference between the first size and the second size causes a difference between the first capacitance and the second capacitance.

5. The combination according to claim 4, wherein the varistor body has a disk shape with a front surface, a back surface, an outer side surface, and an inner side surface, and a center hole, the center hole being defined by the inner side surface and extending from the front surface to the back surface, the rotation shaft is inserted through the center hole of the varistor body, and at least one of the plurality of electrodes extends over at least two of the front surface, the back surface, then outer side surface, and the inner side surface of the varistor body.

6. The combination according to claim 4, wherein the ring varistor comprises a plurality of ring varistor members, each of the plurality of commutator segments of the commutator is connected to a corresponding one of a plurality of electrodes of each of the plurality of ring varistor members.

7. The combination according to claim 1, wherein the varistor body includes a semiconductor ceramic layer and an insulation layer on the semiconductor ceramic layer, the plurality of electrodes are located on the insulation layer, a first one of the plurality of electrodes is located on a first portion of the insulation layer, a second one of the plurality of electrodes is located on a second portion of the insulation layer, the first portion of the insulation layer has a first thickness, the second portion of the insulation layer has a second thickness different from the first thickness, and a difference between the first thickness and the second thickness causes a difference between the first capacitance and the second capacitance.

8. The combination according to claim 1, wherein the power source includes a direct current power supply for generating the direct current voltage and a alternating current power supply for generating the alternating current voltage.

9. A direct current motor comprising:

an armature coil including at least three phase coils;

a commutator having a plurality of commutator segments connected to the armature coil;

a pair of brushes in slidable contact with the commutator to supply power to the phase coils through the commutator;

a rotation shaft;

a ring varistor coaxially fixed to the rotation shaft and including a ring-shaped varistor body and a plurality of electrodes that are circumferentially arranged on a surface of the varistor body, wherein each of the plurality of commutator segments of the commutator is connected to a corresponding one of the plurality of electrodes of the ring varistor, the plurality of electrodes of the ring varistor is paired to form a plurality of electrode pairs, each electrode pair comprising any two of the plurality of electrodes, a first one of the plurality of electrode pairs has a first capacitance therebetween, a second one of the plurality of electrode pairs has a second capacitance therebetween, and the first capacitance is different from the second capacitance.

* * * * *